United States Patent
Saito et al.

(10) Patent No.: US 7,527,677 B2
(45) Date of Patent: May 5, 2009

(54) CARBON DIOXIDE ADSORPTION APPARATUS AND ADSORPTION ELEMENT AND METHOD FOR MANUFACTURE THEREOF

(75) Inventors: Hidefumi Saito, Ibaraki (JP); Yoshihiko Takemura, Ichinomiya (JP); Takatoshi Shoji, Kobe (JP)

(73) Assignees: Shimadzu Corporation, Kyoto (JP); Kawasaki Jukogyo Kabushiki Kaisha, Hyogo (JP)

( * ) Notice: Subject to any disclaimer, the term of this patent is extended or adjusted under 35 U.S.C. 154(b) by 469 days.

(21) Appl. No.: 10/590,820

(22) PCT Filed: Feb. 25, 2005

(86) PCT No.: PCT/JP2005/003176

§ 371 (c)(1), (2), (4) Date: Aug. 25, 2006

(87) PCT Pub. No.: WO2005/082489

PCT Pub. Date: Sep. 9, 2005

(65) Prior Publication Data

US 2007/0169624 A1    Jul. 26, 2007

(30) Foreign Application Priority Data

Feb. 27, 2004    (JP) ............................. 2004-054266

(51) Int. Cl.
*B01D 53/02*    (2006.01)
*B64D 13/00*    (2006.01)

(52) U.S. Cl. .............................. 96/153; 96/154; 252/190

(58) Field of Classification Search .................. 95/139; 96/108, 153, 154; 128/205.28; 502/400; 423/230; 252/181.1, 184, 189–192
See application file for complete search history.

(56) References Cited

U.S. PATENT DOCUMENTS 2,818,323 A * 12/1957 Haensel ...................... 423/228

(Continued)

FOREIGN PATENT DOCUMENTS

JP              63-8413              3/1988

(Continued)

OTHER PUBLICATIONS

International Search Report of PCT/JP2005/003176 date of mailing May 10, 2005.

*Primary Examiner*—Frank M Lawrence
(74) *Attorney, Agent, or Firm*—Westerman, Hattori, Daniels & Adrian, LLP.

(57) ABSTRACT

A carbon dioxide adsorption element rapidly adsorbs a large amount of carbon dioxide, and regenerates amine groups for carbon dioxide adsorption rapidly and uniformly with high-temperature air. The carbon dioxide adsorption element 110 for adsorbing carbon dioxide in air comprises a foil-like or plate-like support member 111, a porous aluminum oxide film 112 covering the support member 111, and the amine groups 113 clinging to the inner surface of each pore 112a of the film 112 for carbon dioxide adsorption. The film 112 is formed by oxidation of aluminum or aluminum alloy. The depth direction of each pore 112a of the film is the thickness direction of the support member 111.

13 Claims, 29 Drawing Sheets

U.S. PATENT DOCUMENTS

| | | | |
|---|---|---|---|
| 4,433,981 A * | 2/1984 | Slaugh et al. | 95/139 |
| 4,810,266 A * | 3/1989 | Zinnen et al. | 95/139 |
| 5,876,488 A * | 3/1999 | Birbara et al. | 96/111 |
| 6,364,938 B1 * | 4/2002 | Birbara et al. | 95/139 |
| 6,547,854 B1 * | 4/2003 | Gray et al. | 95/139 |
| 6,699,309 B1 * | 3/2004 | Worthington et al. | 96/108 |
| 6,712,879 B2 * | 3/2004 | Kato et al. | 95/139 |
| 6,797,043 B2 * | 9/2004 | Nalette et al. | 96/134 |
| 6,908,497 B1 * | 6/2005 | Sirwardane | 95/136 |
| 7,329,307 B2 * | 2/2008 | Hrycak et al. | 95/139 |

FOREIGN PATENT DOCUMENTS

| | | |
|---|---|---|
| JP | 3-7412 B2 | 2/1991 |
| JP | 3-39729 B2 | 6/1991 |
| JP | 6-55071 A | 3/1994 |
| JP | 2001-174009 A | 6/2001 |
| JP | 2001-317307 A | 11/2001 |

* cited by examiner

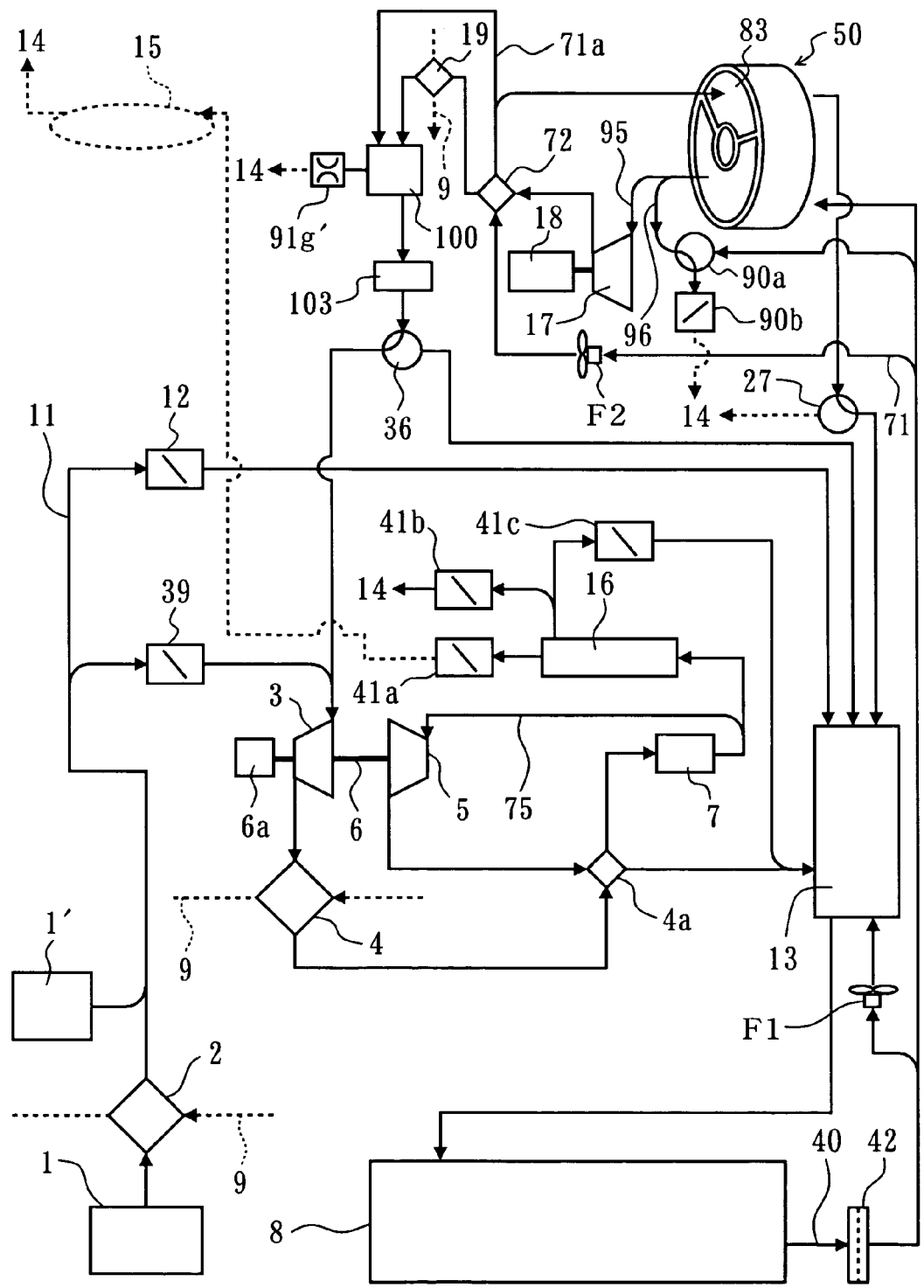
[Fig. 1]

[Fig. 2]
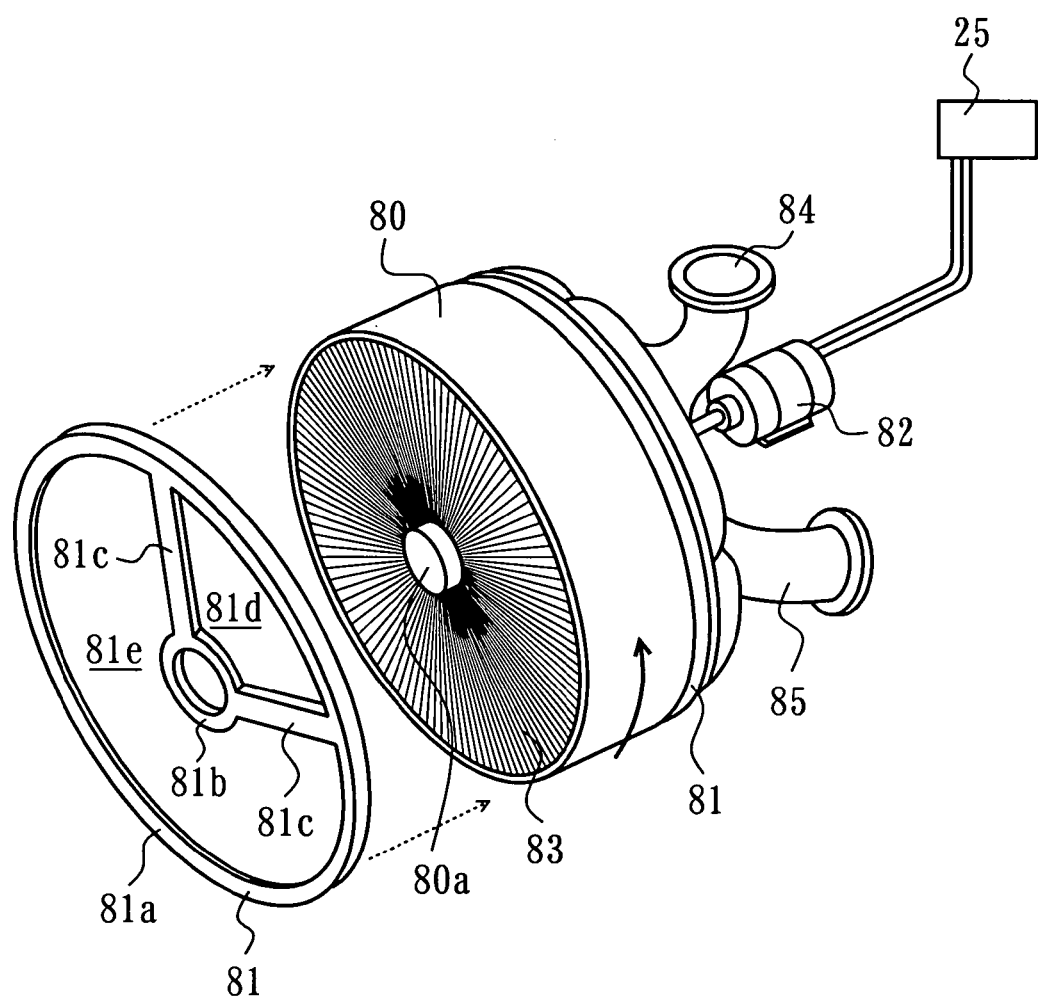

[Fig. 3]
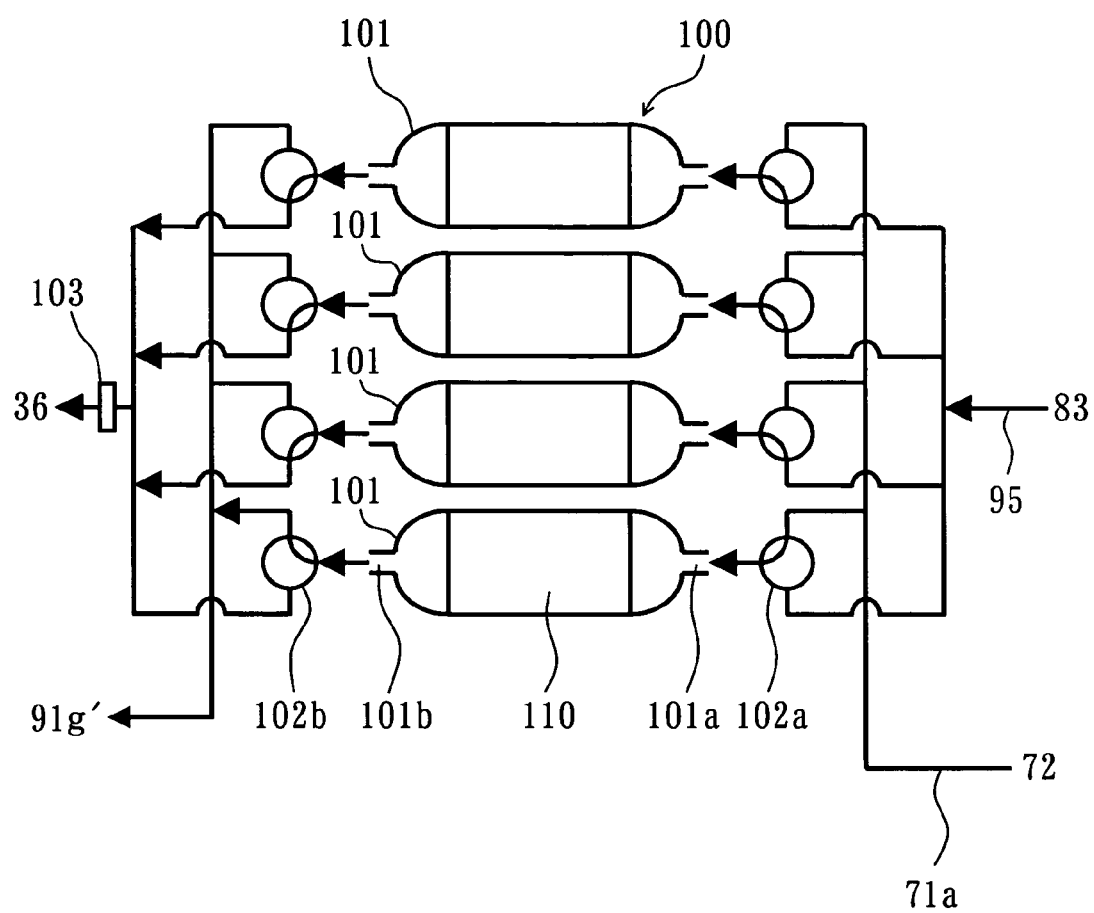

[Fig. 4]
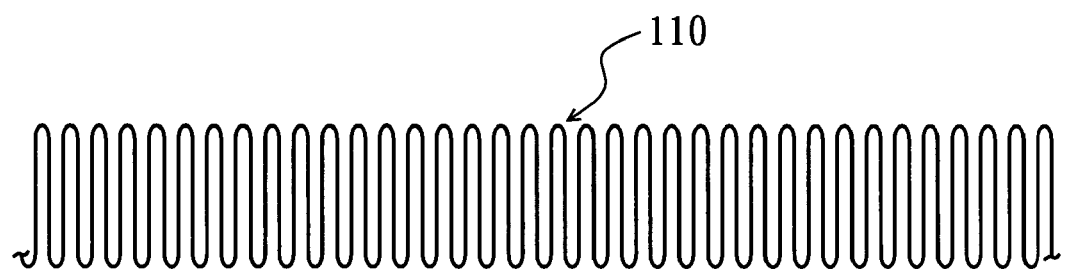

[Fig. 5A]
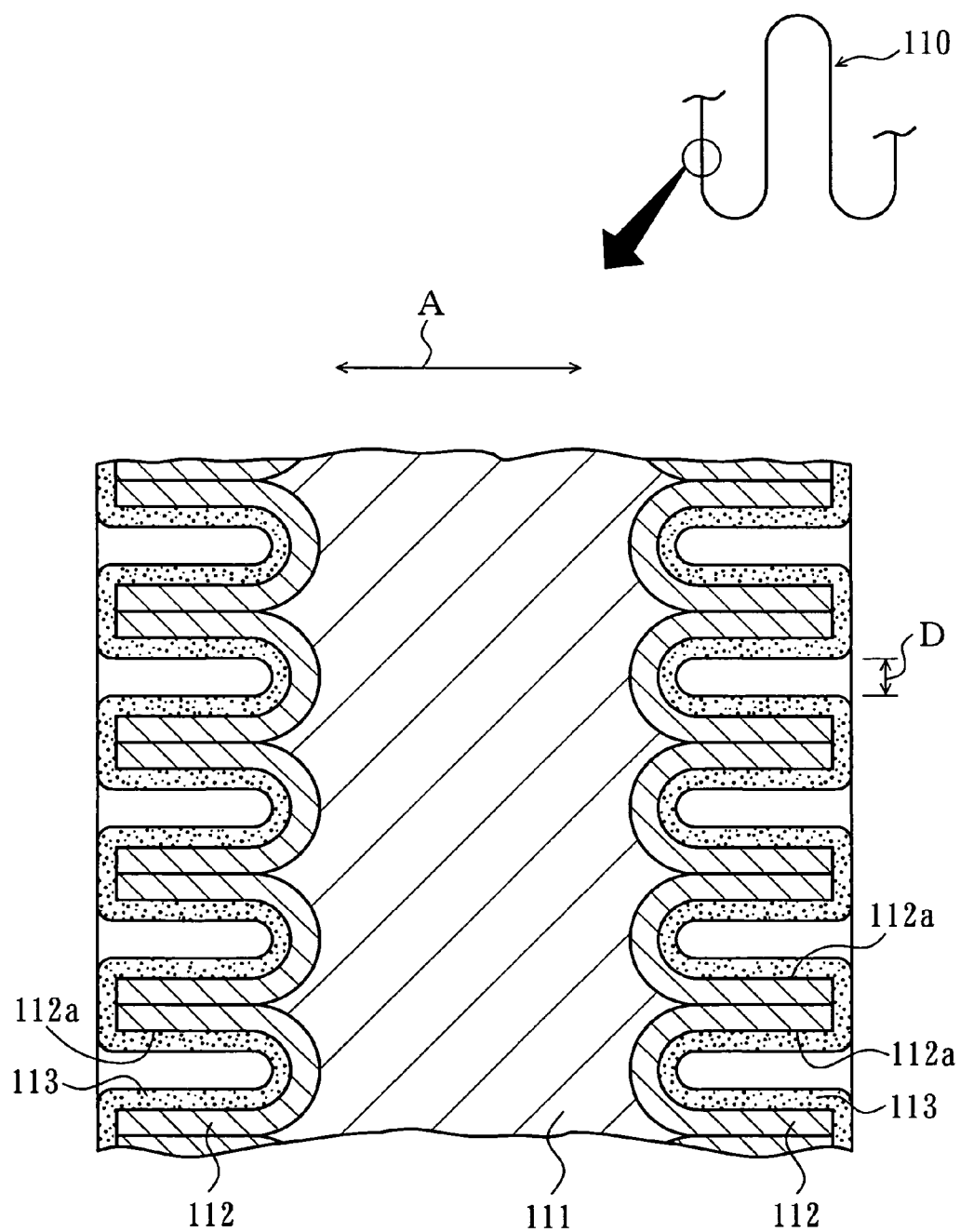

[Fig. 5B]
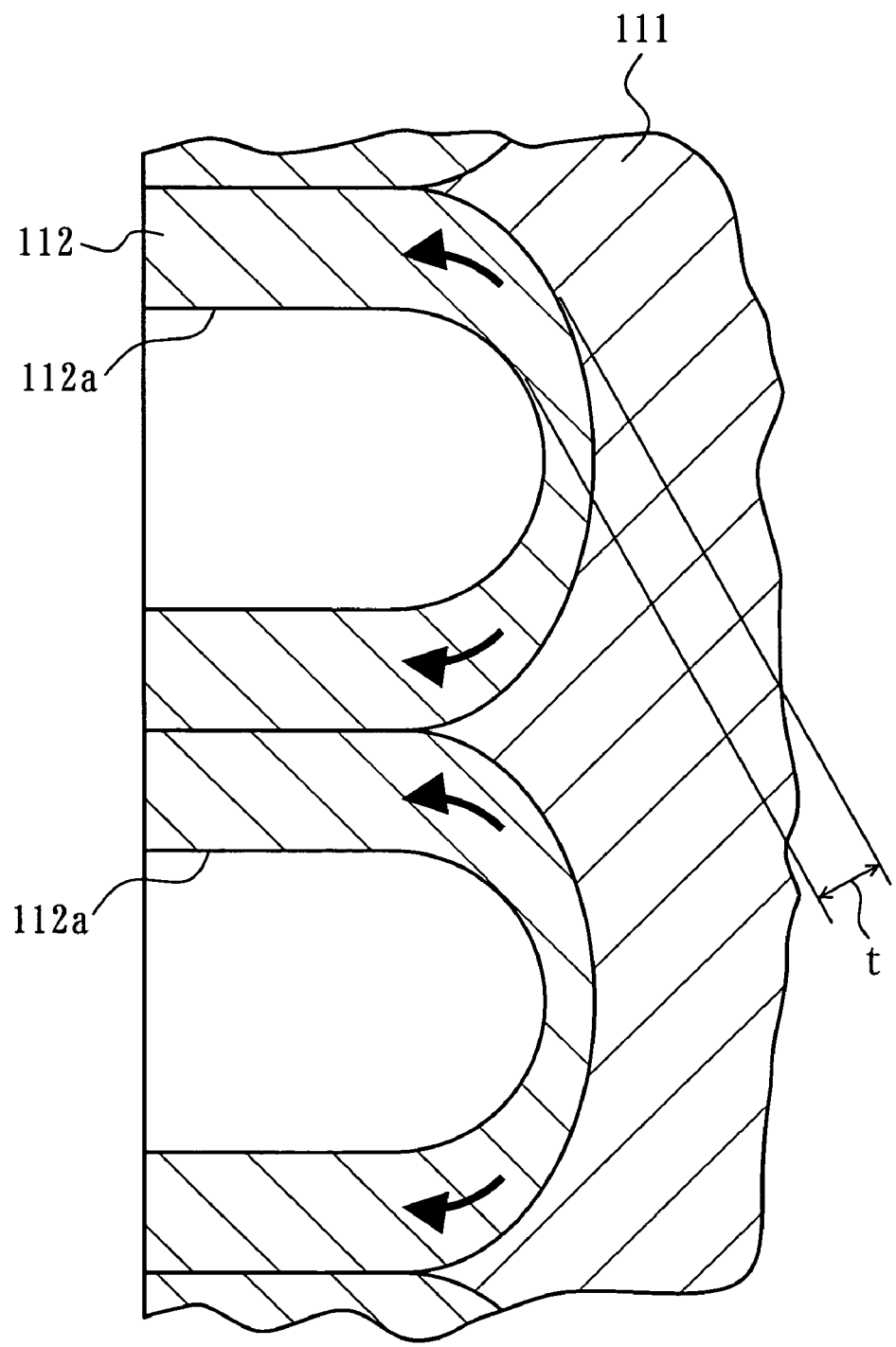

[Fig. 5C]
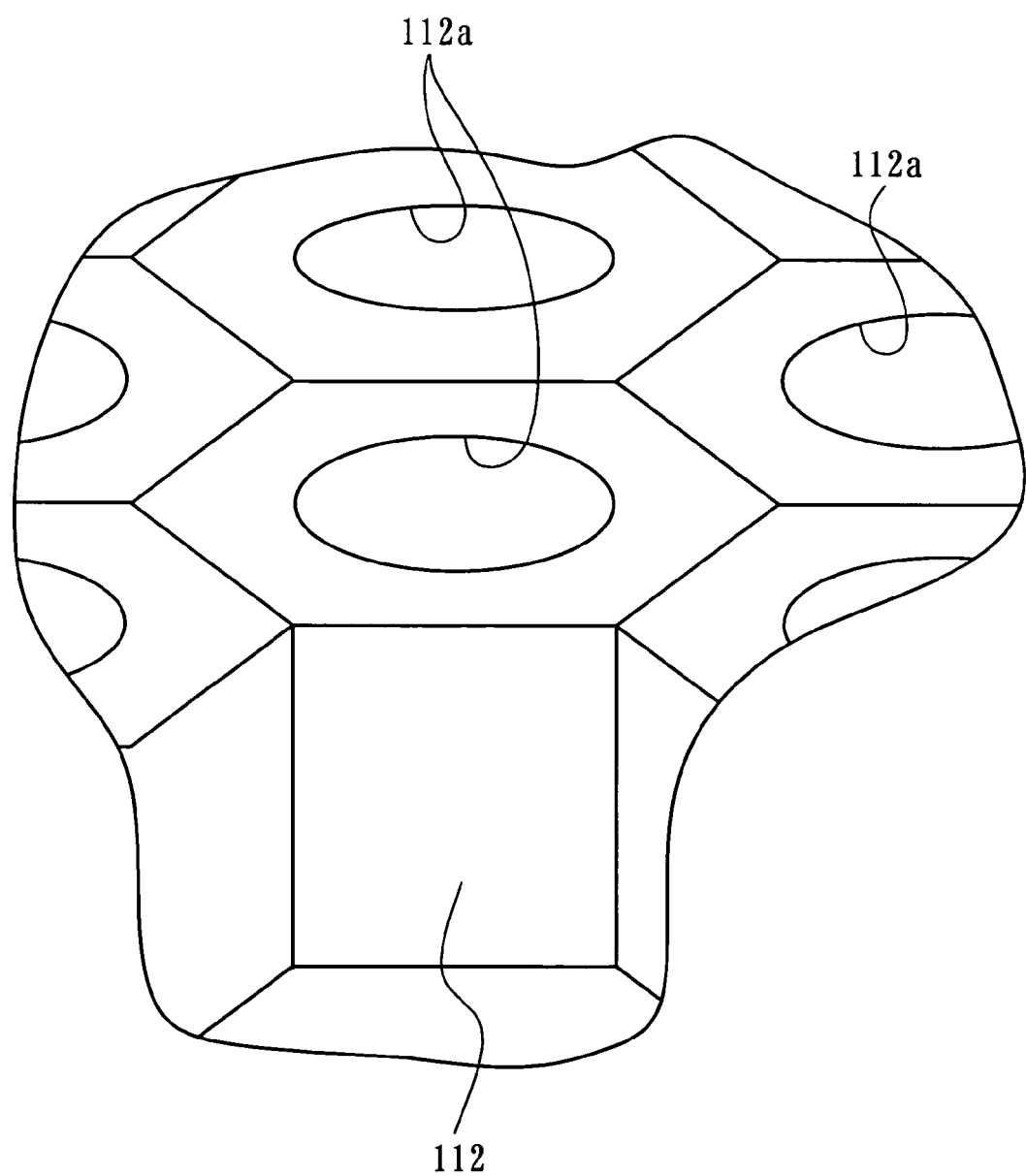

[Fig. 6A]
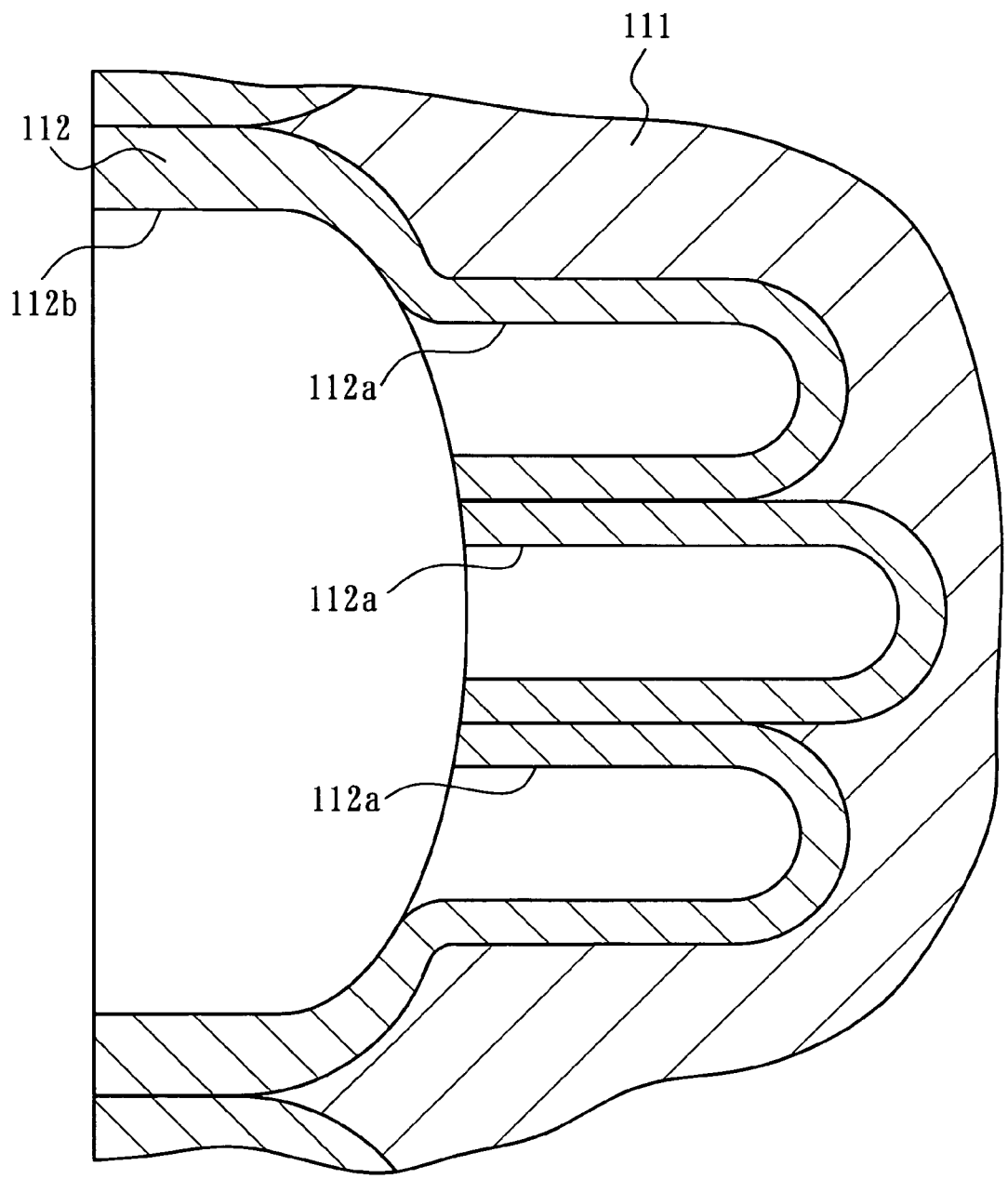

[Fig. 6B]
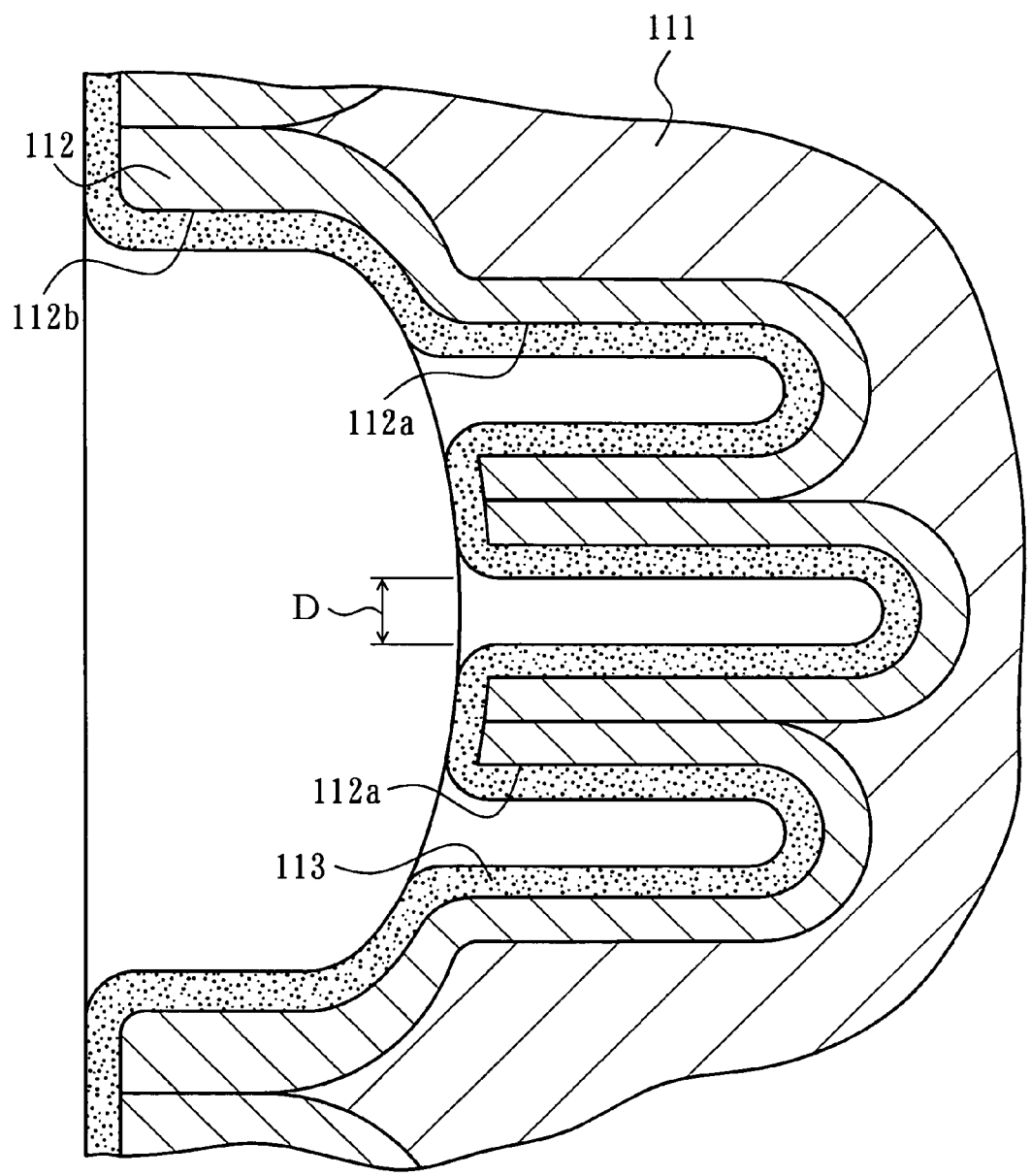

[Fig. 7]
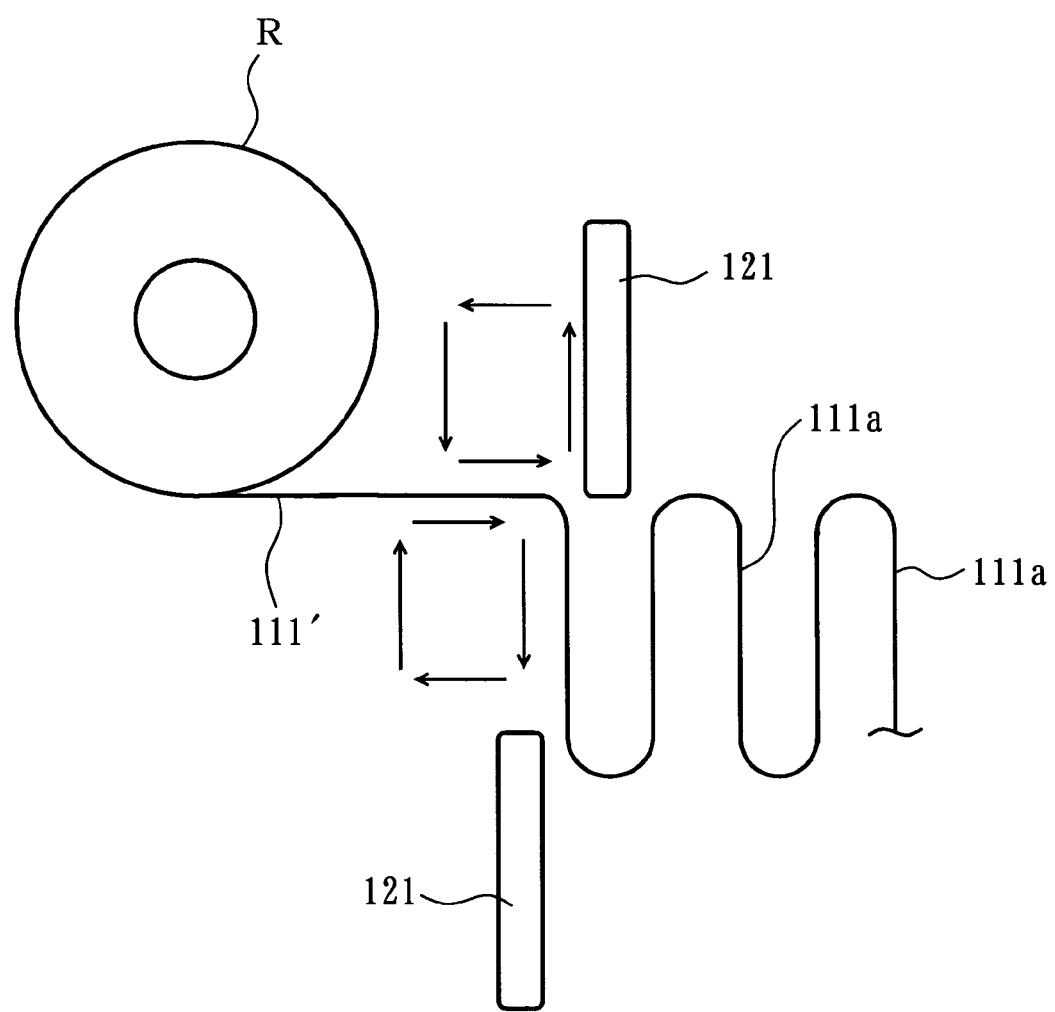

[Fig. 8]
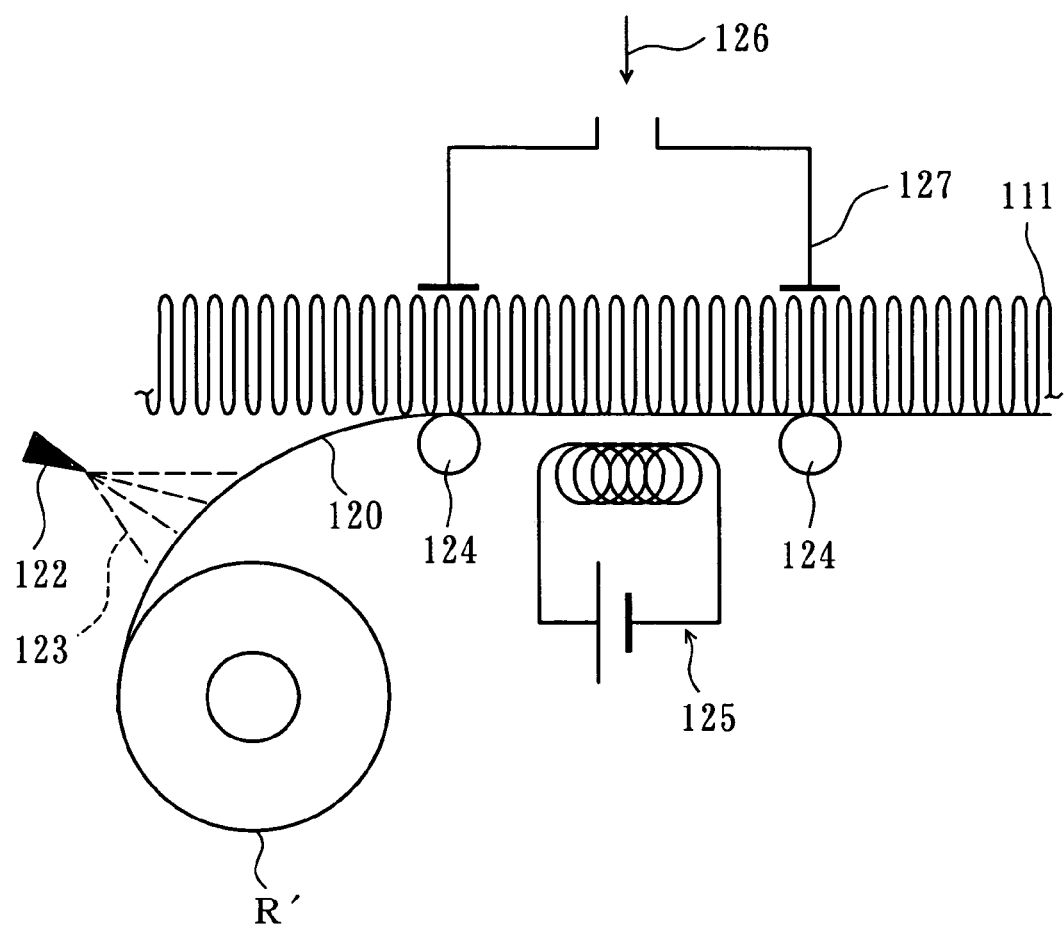

[Fig. 9]
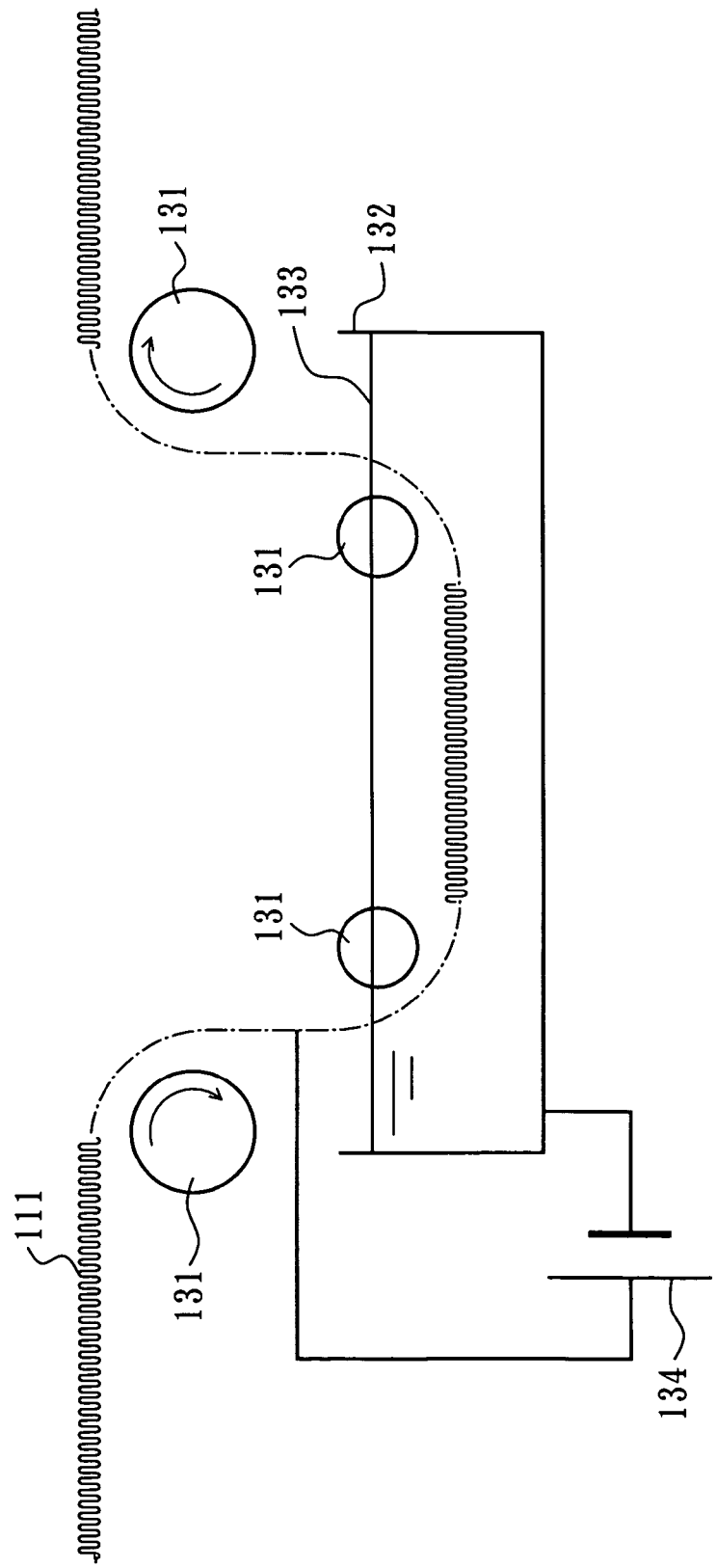

[Fig. 10]
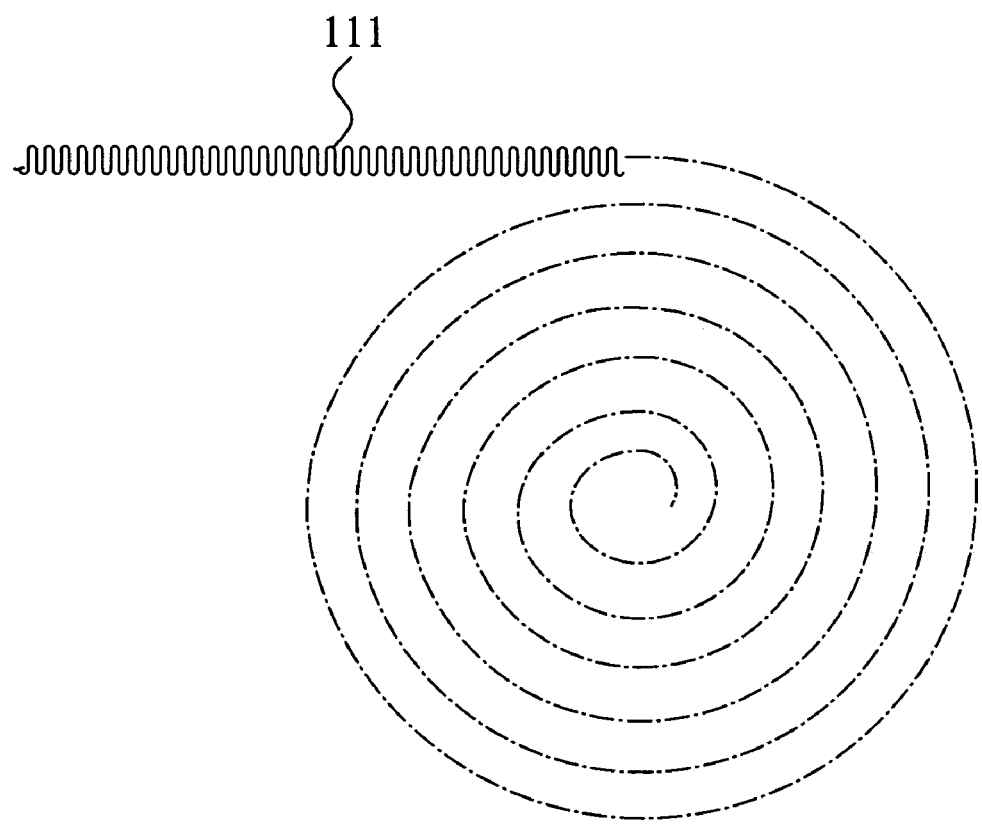

[Fig. 11]
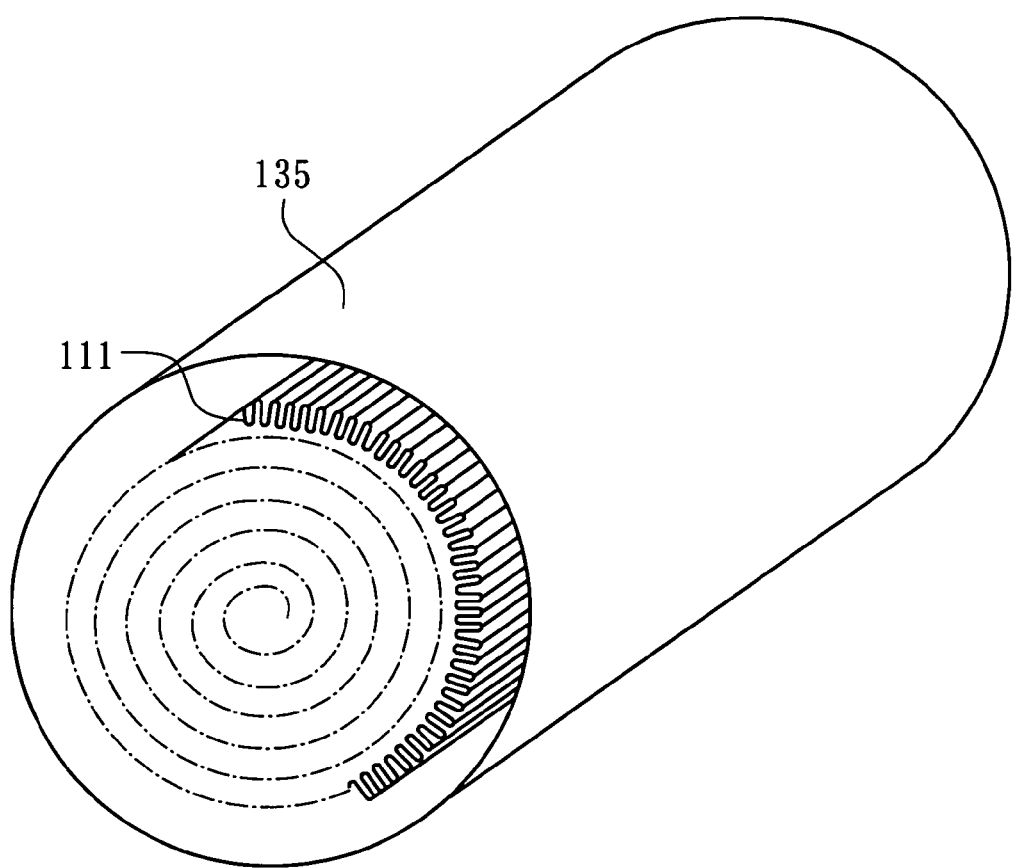

[Fig. 12]
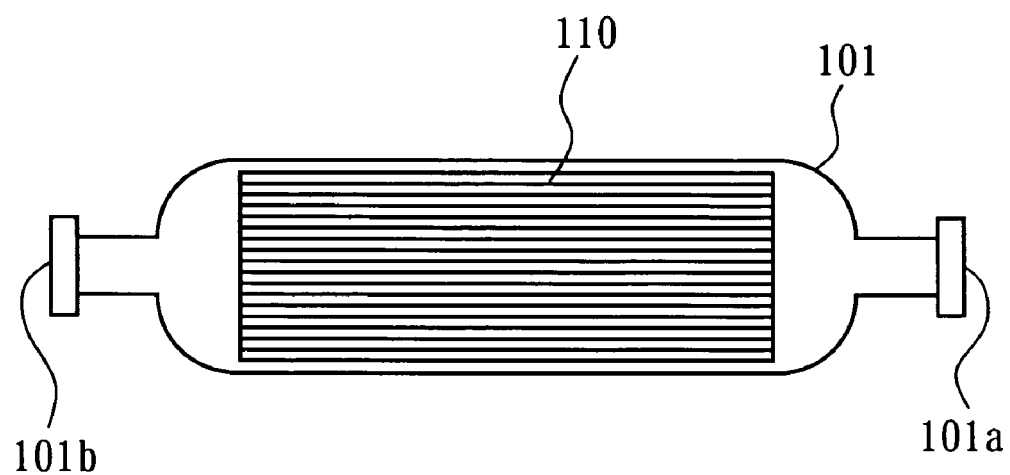

[Fig. 13]
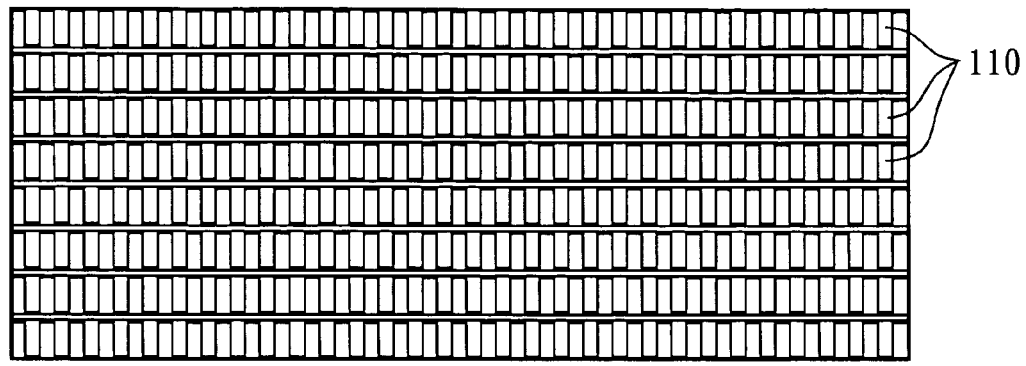

[Fig. 14]
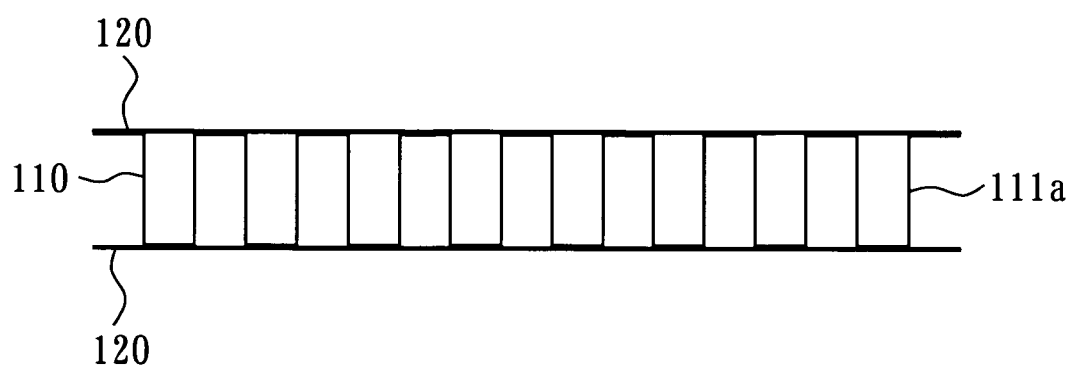

[Fig. 15]
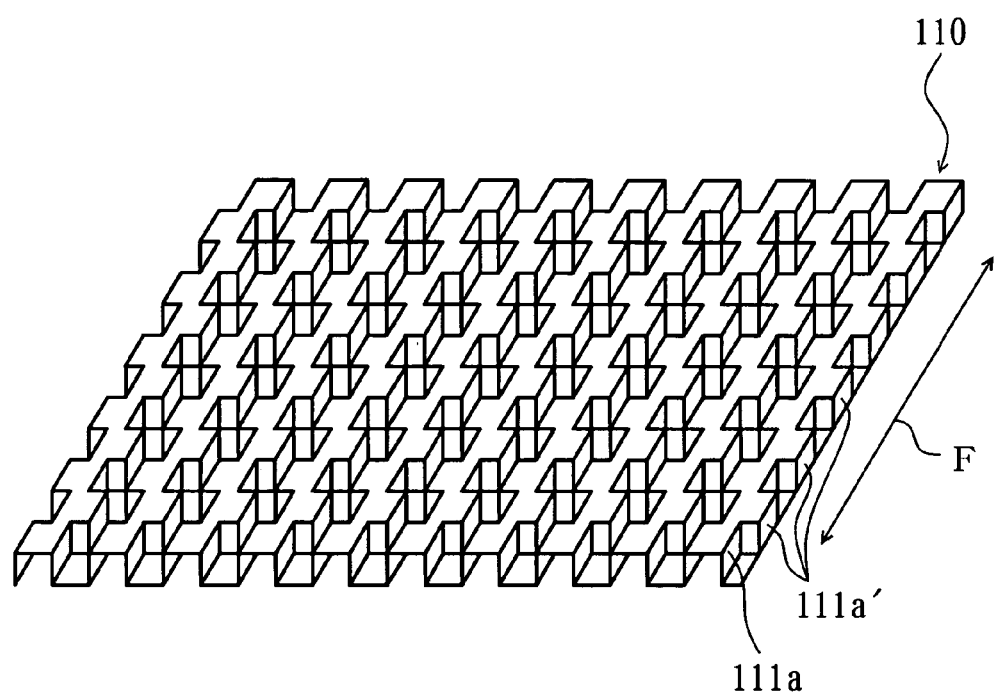

[Fig. 16]
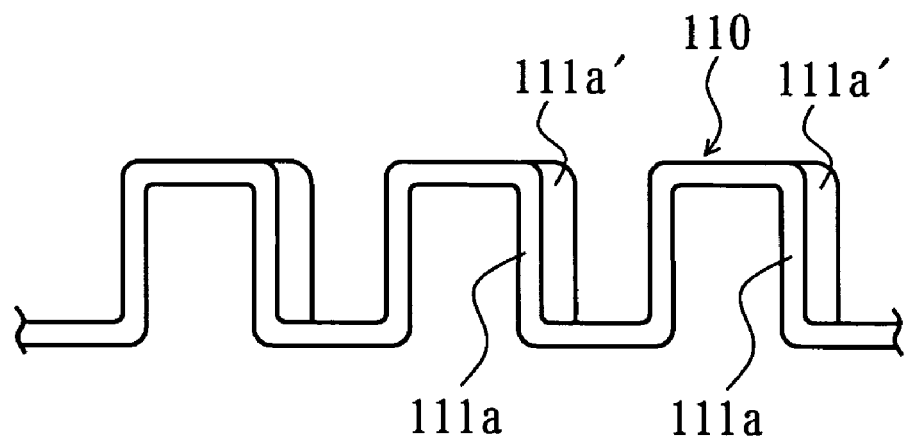

[Fig. 17]
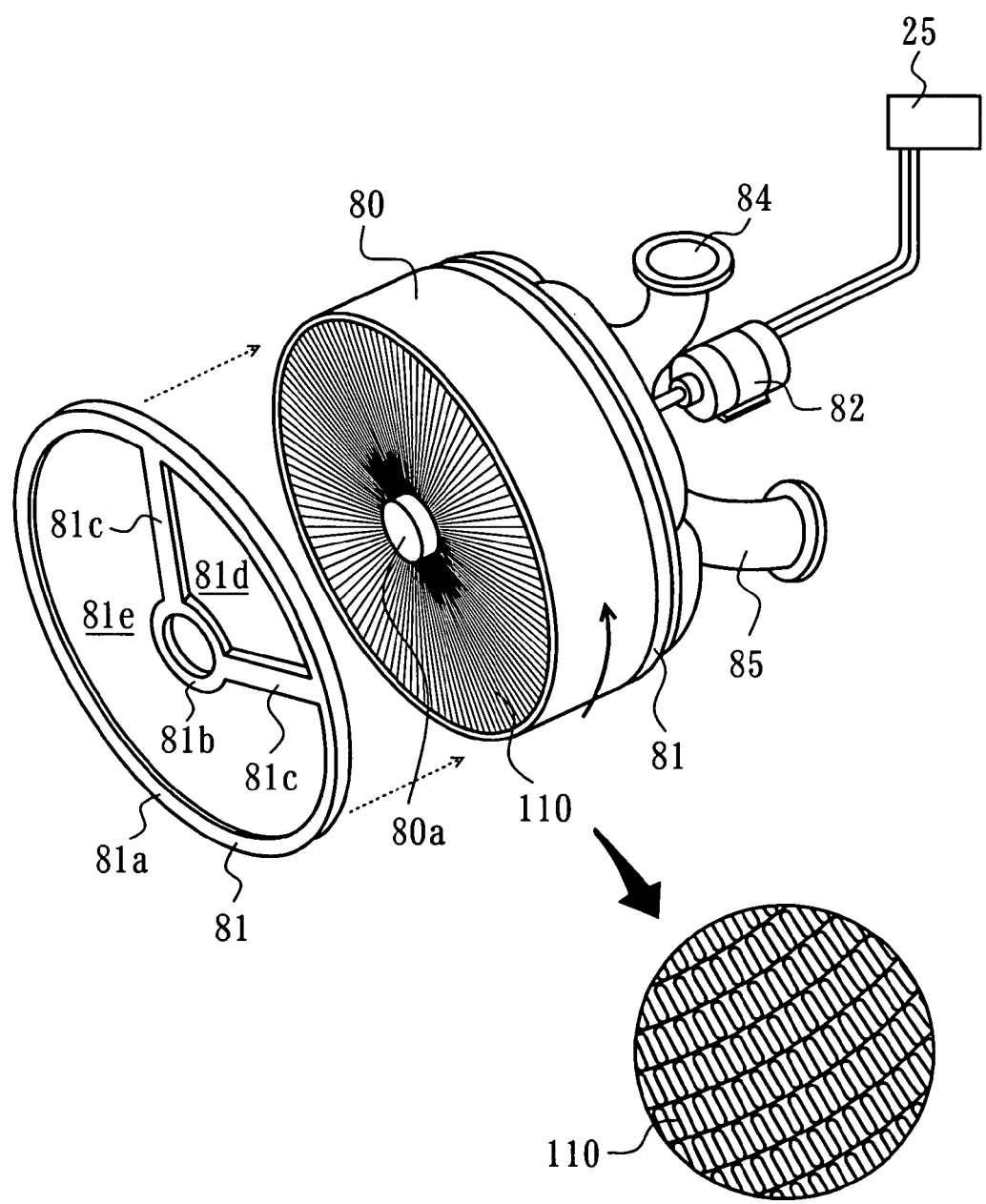

[Fig. 18]
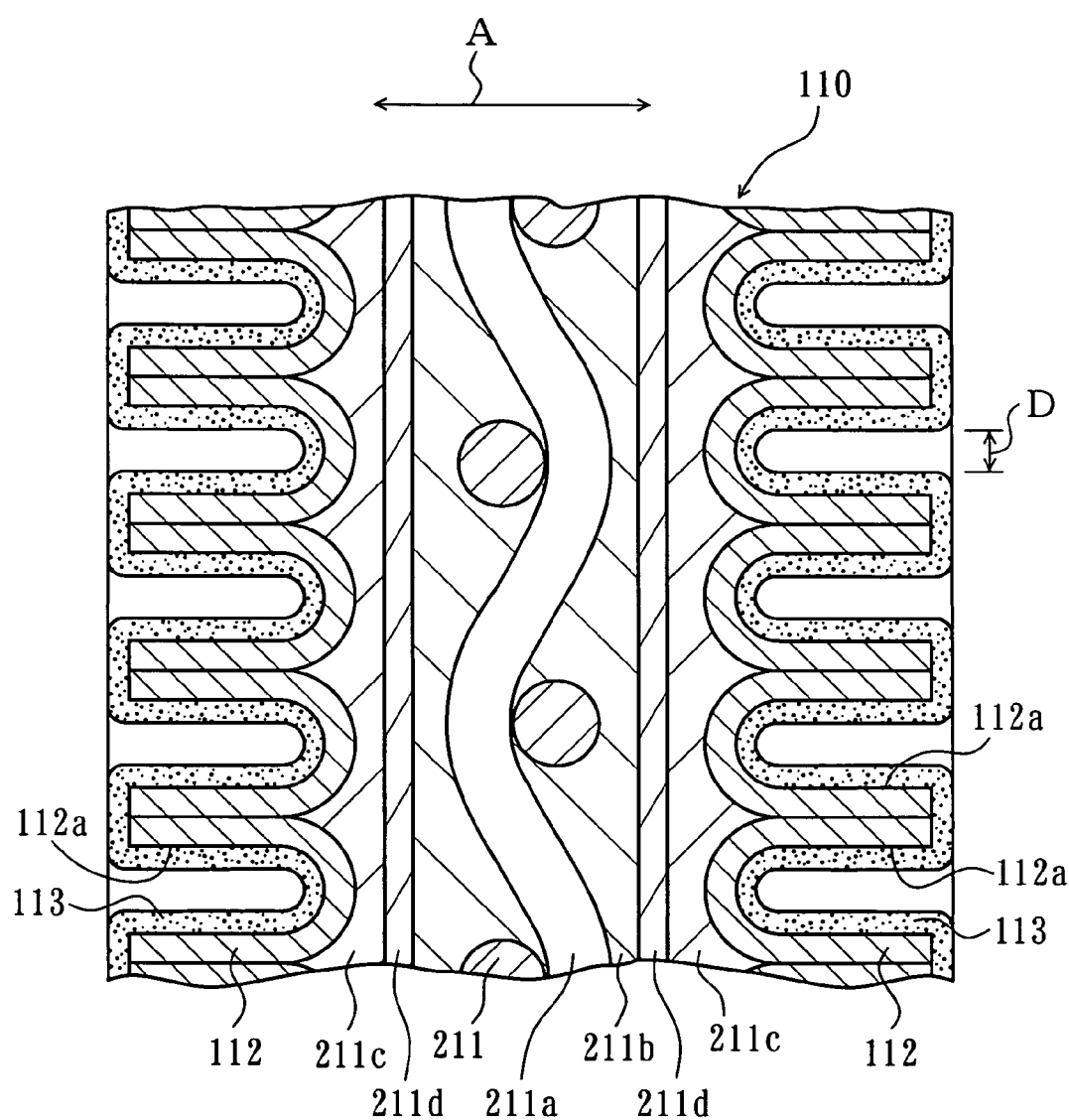

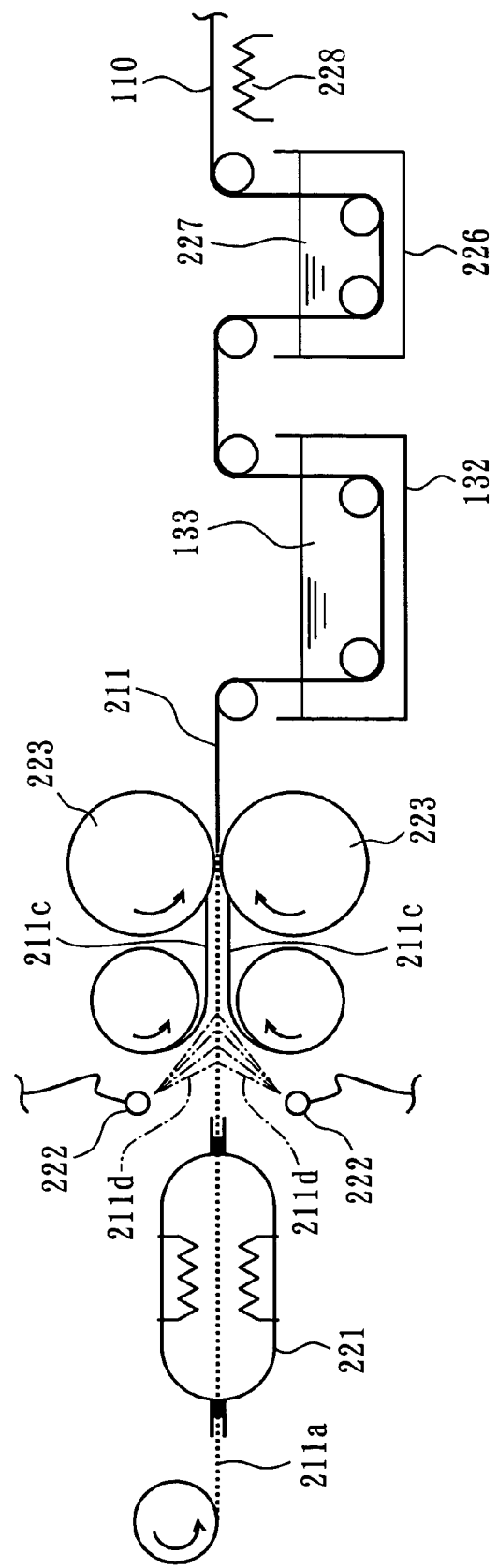
[Fig. 19]

[Fig. 20]
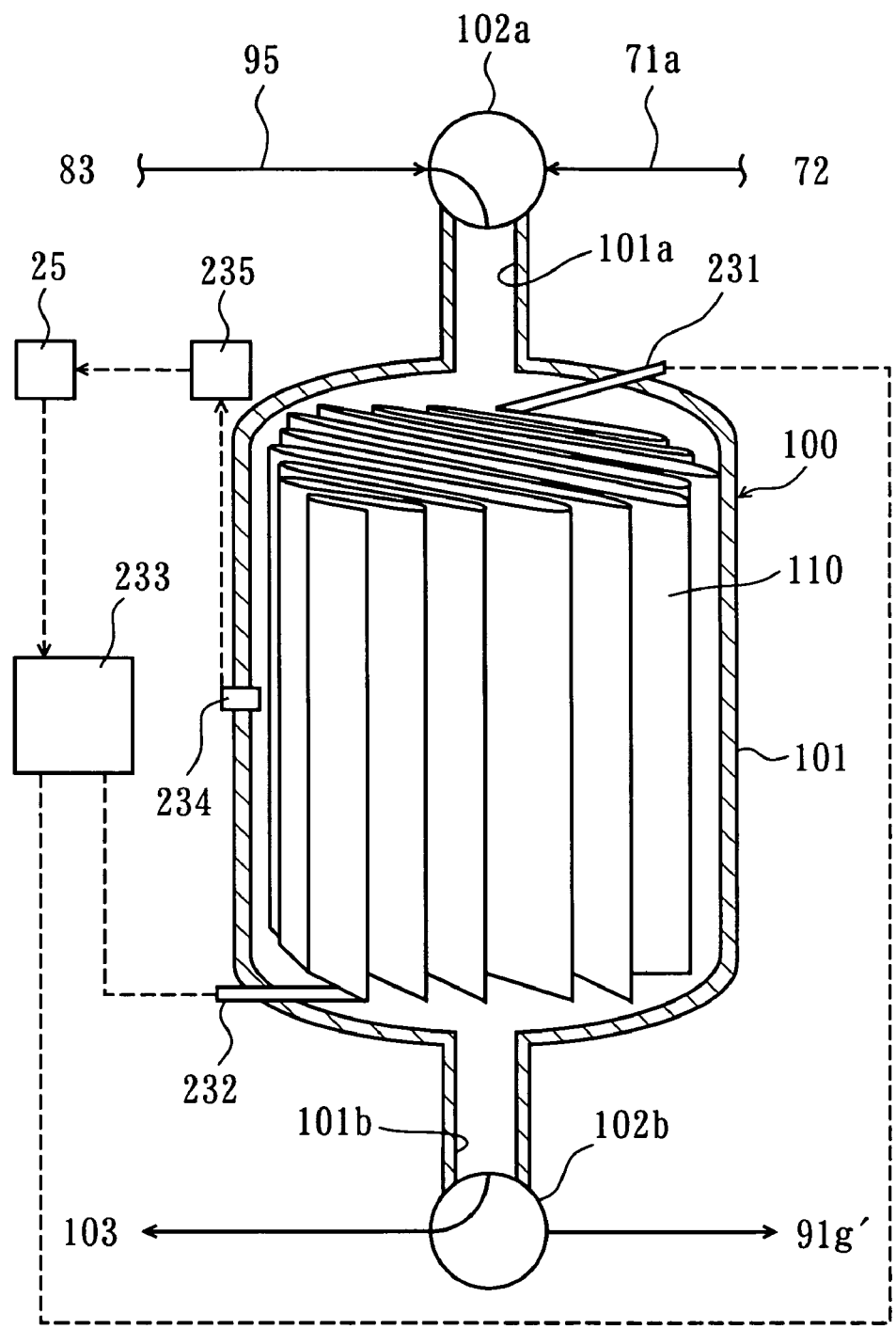

[Fig. 21]
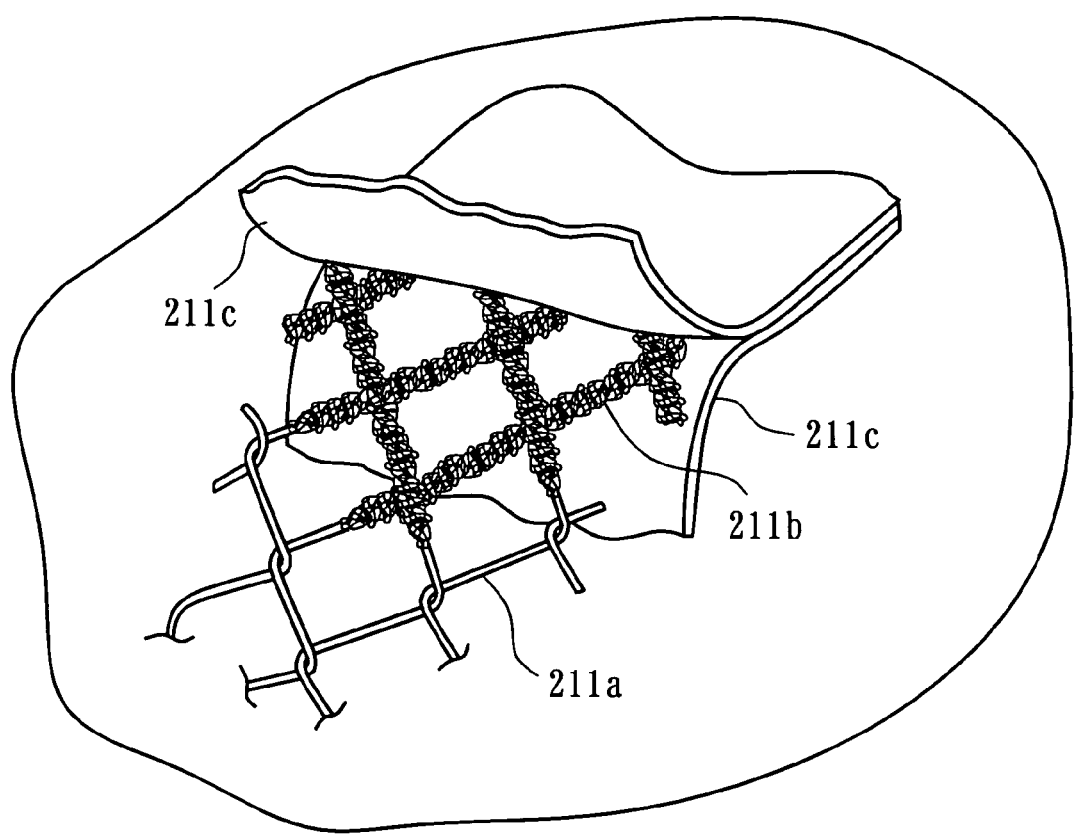

[Fig. 22]
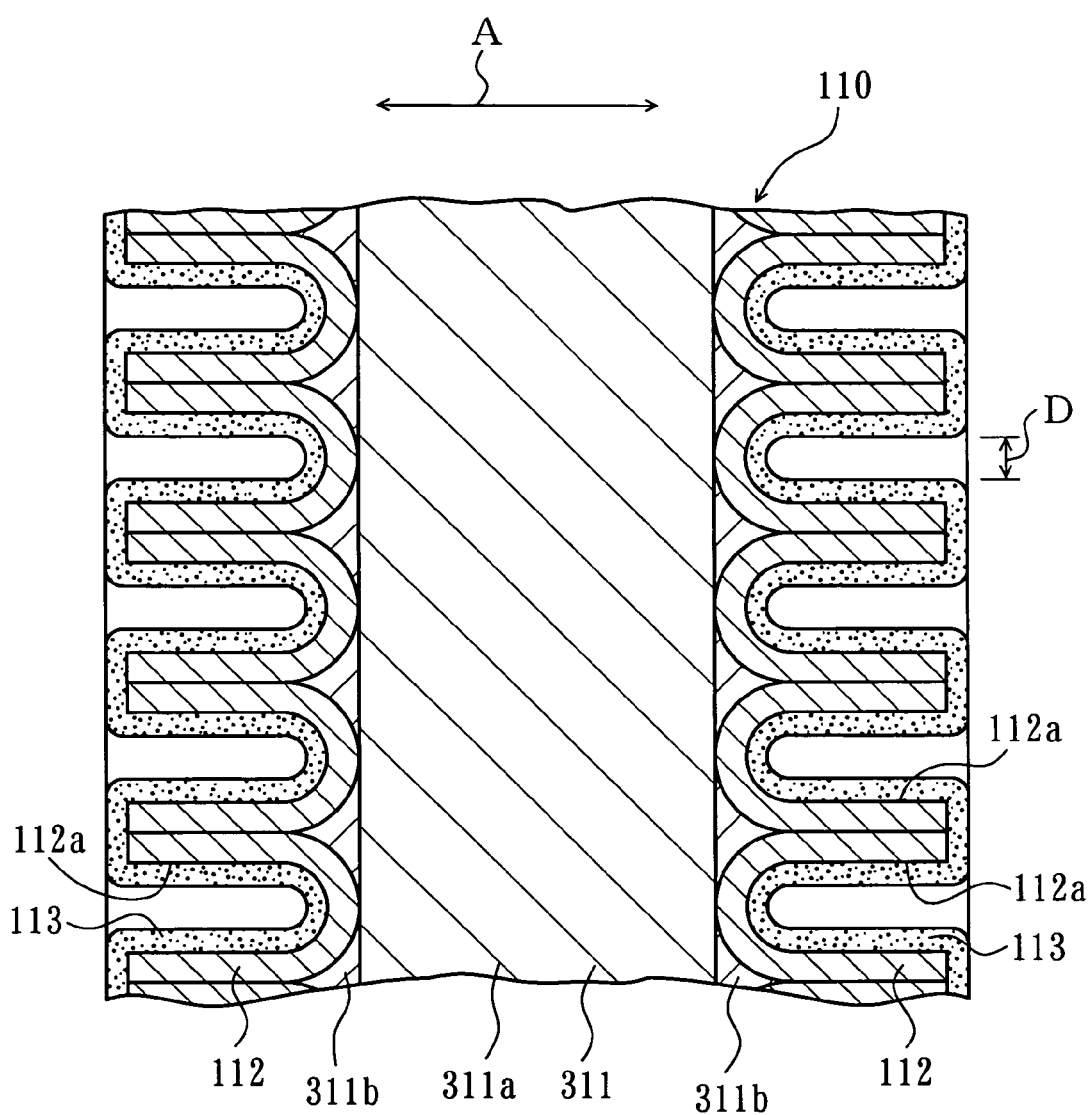

[Fig. 23]
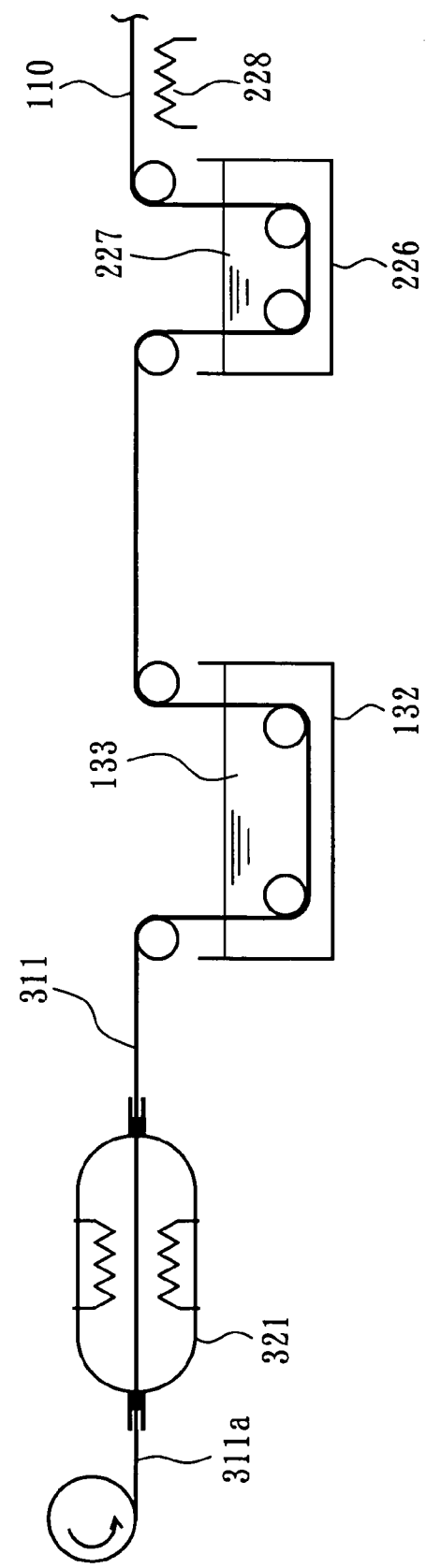

[Fig. 24]
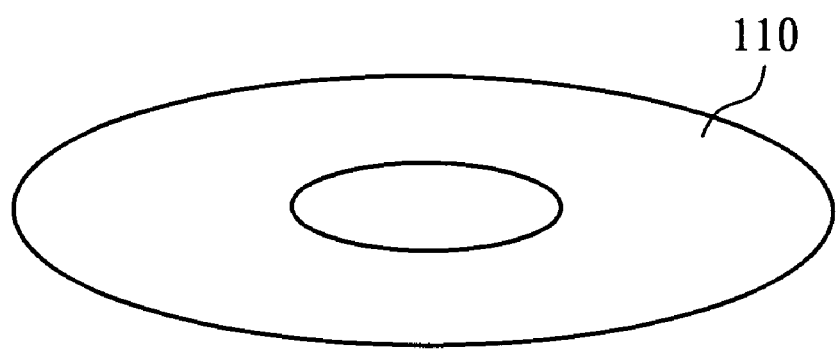

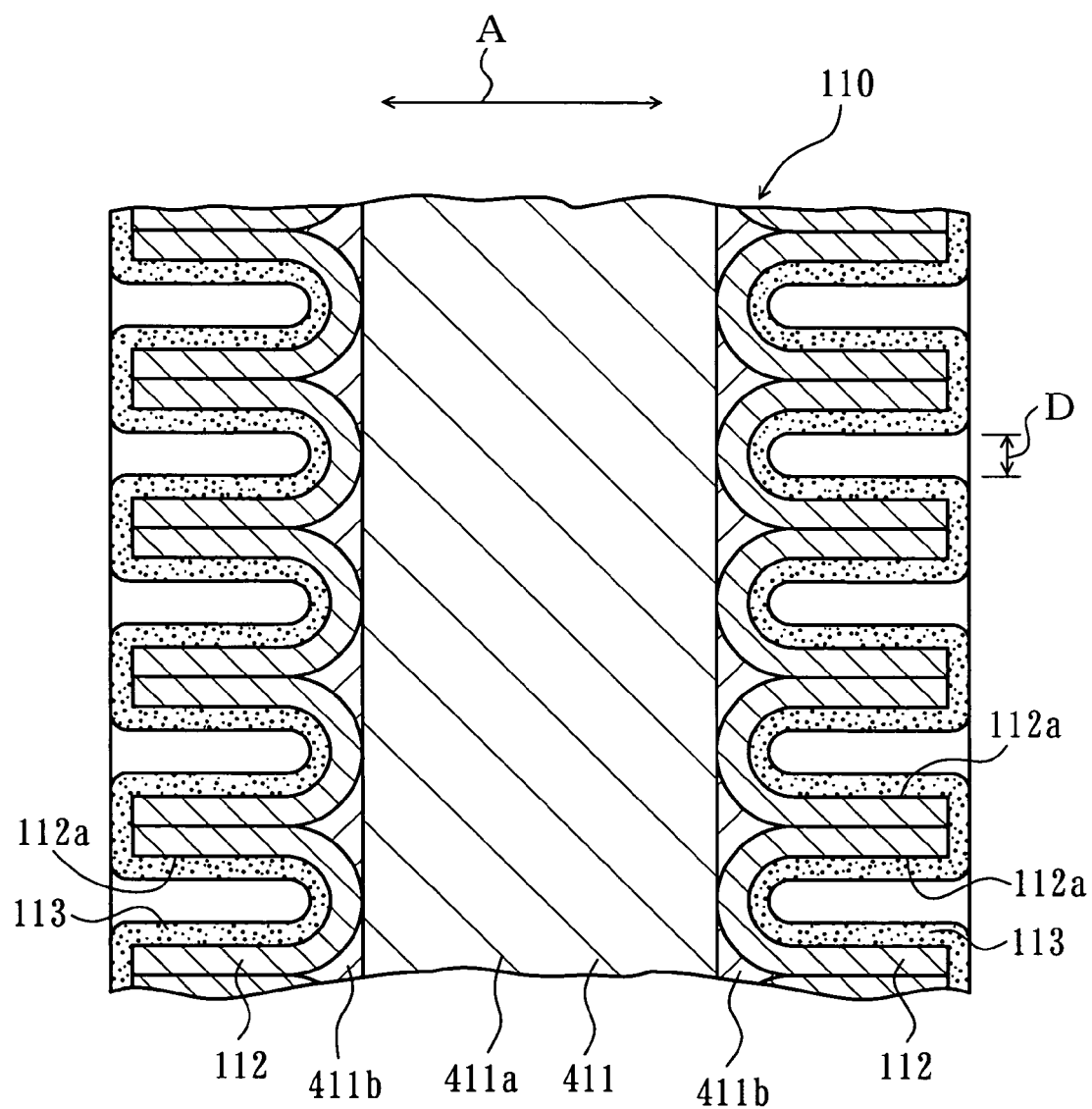
[Fig. 25]

[Fig. 26]
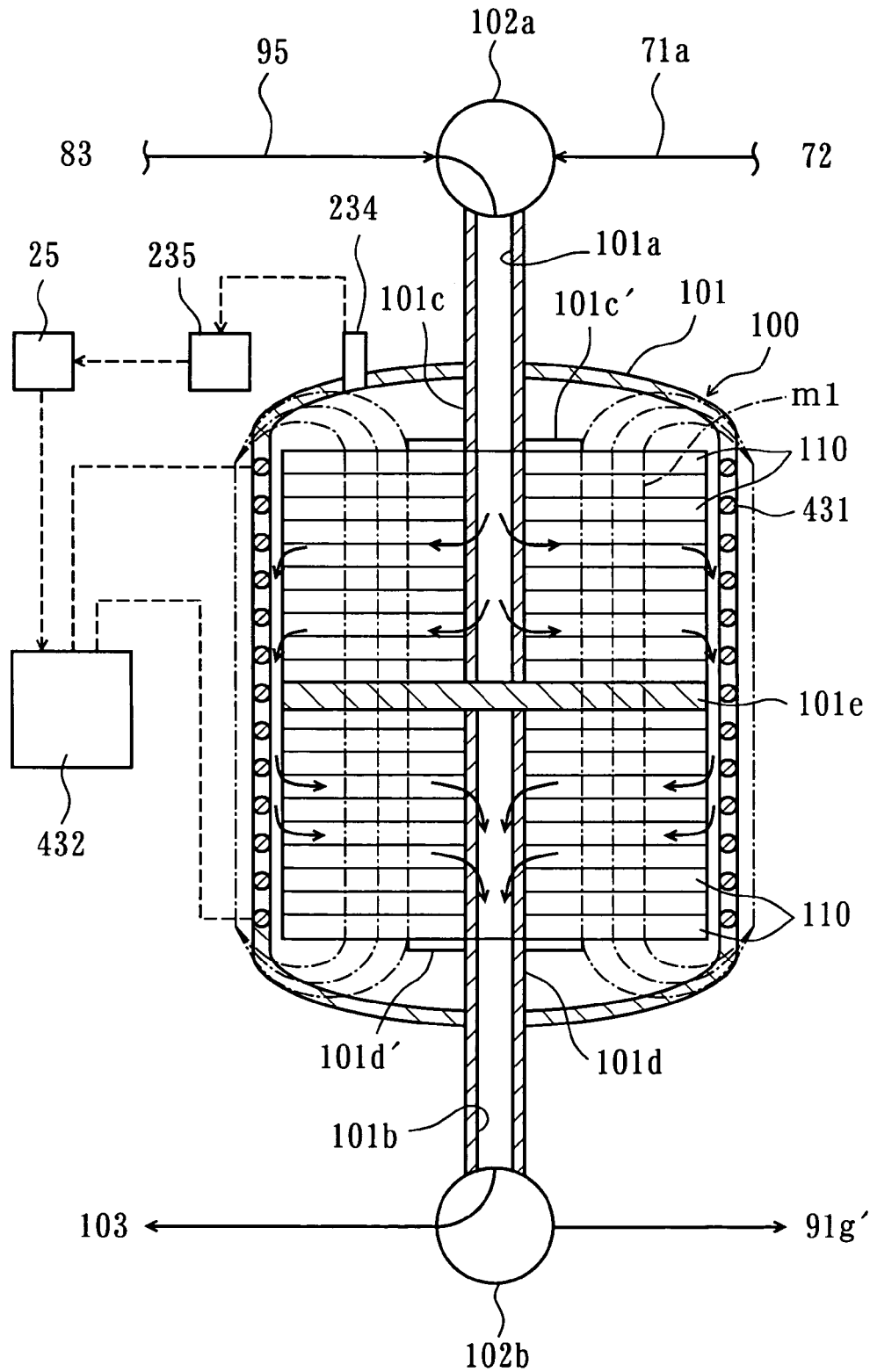

CARBON DIOXIDE ADSORPTION APPARATUS AND ADSORPTION ELEMENT AND METHOD FOR MANUFACTURE THEREOF

TECHNICAL FIELD

The present invention relates to a carbon dioxide adsorption apparatus and adsorption element used for adsorbing carbon dioxide in the air, for example, inside a cabin of an aircraft, and to a method for manufacturing the apparatus and element.

BACKGROUND ART

An element with porous resin fine powder or a grid-shaped structure made from ceramic such as silicon dioxide or alumina to which amine groups having excellent carbon dioxide adsorption characteristic cling is known as a carbon dioxide adsorption element. To be more precise, it was proposed to construct an air flow path filled with fine powder having amine groups clinging thereto or to charge fine powder having amine groups clinging thereto into an air flow path consisting of grid-shaped structure having amine groups clinging thereto so as to adsorb carbon dioxide contained in the air flowing through the air flow path (refer to patent documents 1, and 2).

Patent document 1: Japanese Examined Patent Applications HEI No. 3-7412
Patent document 2: Japanese Examined Patent Applications HEI No. 3-39729

DISCLOSURE OF THE INVENTION

Problem to be Solved by the Invention

When fine powder having amine groups clinging thereto are charged into an air flow path, as in the conventional configuration, resistance to air flow increases; therefore the air has to flow at a large volume flow rate in order to adsorb the carbon dioxide contained in the air in a space of a large volume, and rapid adsorption is difficult. Furthermore, when a regeneration treatment is conducted by which the adsorbed carbon dioxide is released by heating the amine groups with high-temperature air, the resistance to the flow of the high-temperature air also rises, thereby rapid regeneration treatment is prevented. Moreover, the heat of the high-temperature air for regeneration is difficult to transfer rapidly and uniformly to the amine groups in the conventional carbon dioxide adsorption element, so that rapid regeneration treatment is difficult. The conventional carbon dioxide adsorption element are thus not suitable for adsorbing carbon dioxide contained in the air in a closed space accommodating a large number of people.

For example, in a large aircraft, if the amount of air extracted from engine for a cabin is reduced in order to maintain the engine performance, the rate of fresh air in the cabin decreases. However, if the rate of fresh air taken from the outside of the airplane is reduced, the concentration of carbon dioxide fails to satisfy the requirement of 5000 ppm (0.5%) or less, which is a regulation recommended by the FAA (Federal Aviation Administration, USA). Because the concentration of carbon dioxide in the alveoli of human lung is about 3%, dangerous conditions cannot be immediately created at the 5000 ppm; however, an effect such as reduction of mental capacity of some people can be produced at a higher concentration. For this reason, it is desirable that carbon dioxide is rapidly adsorbed and the adsorbed carbon dioxide is rapidly released to regenerate the amine groups. Furthermore, in large aircrafts, the carbon dioxide concentration should be low and less than 0.5% while the internal volume of fuselage is large, the flow rate of air passing through the carbon dioxide adsorption zone has to be thus increased in order to remove the carbon dioxide from the air in the aircraft. However, electric energy required for air compression is necessary to compensate for pressure loss in the carbon dioxide adsorption zone, so that load on the engine having a power generator increases; therefore, it is desired that this pressure loss is reduced. Furthermore, it is desirable that the adsorption of carbon dioxide is conducted with good efficiency, but energy consumption treatments such as a pressurization treatment of circulating air or the like is restricted because the use of energy in the aircraft is restricted, and a pressure-resistant structure capable of treating high pressure is unsuitable for aircrafts that require weight reduction because the weight increases. Moreover, when it is used in aircrafts, normal functions should be maintained even in the environment involving shaking, vibrations, and acceleration, and also small size and small weight are required. It is an object of the present invention to resolve those problems.

Means for Solving the Problems

The carbon dioxide adsorption element for adsorbing carbon dioxide contained in air in accordance with an aspect of the present invention comprises a foil-like or plate-like support member, a porous aluminum oxide film covering the support member, and amine groups clinging to the inner surface of each pore of the film for carbon dioxide adsorption, wherein the film is formed by oxidation of aluminum or aluminum alloy, and the depth direction of each pore of the film is the thickness direction of the support member. As a result, a carrier of the amine groups is structured by the support member and porous film formed on the surface of the support member.

The method for manufacturing a carbon dioxide adsorption element in accordance with the present invention comprises the steps of forming a foil-like support member made from aluminum or aluminum alloy, forming a porous film by conducting anodization of the surface layer of the support member, and causing amine groups for carbon dioxide adsorption to cling to the inner surface of each pore of the film. Alternatively, the method comprises the steps of forming a plate-like support member in which at least the surface layer is made from aluminum or aluminum alloy, forming a porous film by conducting anodization of the surface layer of the support member, and causing amine groups for carbon dioxide adsorption to cling to the inner surface of each pore of the film.

In accordance with the present invention, because the foil-like or plate-like support member is thin, the resistance to the flow of air can be reduced and the adsorption of carbon dioxide contained in the air can be rapidly performed without increasing the pressure loss in the air flow path constituted by the carbon dioxide adsorption element in accordance with the present invention, by causing the air to flow along the surface of the support member in the air flow path. Furthermore, because the support member is thin and has a small weight, the carbon dioxide adsorption element is reduced in size and weight, the structure thereof is simplified, and it can function normally even in an environment where it is subjected to shaking, vibrations, and acceleration; furthermore, flow paths along the surface of the support member of the carbon dioxide adsorption element can be configured by winding or bending the carbon dioxide adsorption element into a roll, or by stacking a plurality of carbon dioxide adsorption elements. When plate-like carbon dioxide adsorption elements are stacked, gaps constituting air flow paths between the surfaces of stacked carbon dioxide adsorption elements can be ensured by forming multiple protrusions projecting from the surfaces of the carbon dioxide adsorption elements or by inserting spacers. A large number of protrusions that project from the surfaces of the carbon dioxide adsorption elements can be formed by providing peaks and valleys on the support member, e.g., by pressing prior to forming the film.

It is preferred that the support member is made from aluminum or aluminum alloy, and that the film is formed by oxidation of the surface layer of the support member. Because the amine groups can adsorb carbon dioxide contained in the air and can release the adsorbed carbon dioxide when the temperature rises above that at the time of adsorption process, the amine groups can be regenerated by causing the high-temperature air to flow in the air flow path. Because the support member is made from aluminum or aluminum alloy with excellent thermal conductivity, even if it is heated locally, the heat is diffused and distributed uniformly, thereby preventing the amine groups from transformation and degradation due to increase in temperature. As a result, the carbon dioxide adsorption elements can be heated so that a uniform temperature distribution is achieved and can be heated uniformly and rapidly to a temperature suitable for regenerating the amine groups with the heat of the high-temperature air.

The carbon dioxide adsorption element for adsorbing carbon dioxide contained in air in accordance with another aspect of the present invention comprises a support member, a porous film covering the support member, and amine groups clinging to the inner surface of each pore of the film for carbon dioxide adsorption, wherein the support member includes an element that is heated by electric energy, and carbon dioxide adsorbed by the amine groups is released by heating the element.

As a result, the temperature of the element rises to a level suitable for regenerating the amine groups within a short time by electric energy, so that the regeneration of amine groups can be carried out rapidly. Therefore, the cycle of carbon dioxide adsorption and regeneration can be shortened, so the size and weight of the carbon dioxide adsorption apparatus can be reduced even when a large amount of carbon dioxide is treated, making it suitable for installation in an aircraft. In this case, it is preferred that the support member is foil-like or plate-like, and the depth direction of each pore of the film is the thickness direction of the support member. Any porous material can be used for the covering film, but a porous aluminum oxide formed by oxidizing aluminum or aluminum alloy is preferred.

Furthermore, it is preferred that the element is an electric resistance element having electrical conductivity and connected to a power supply unit for resistance heating, and that carbon dioxide adsorbed by the amine groups is released by resistance heating of the electric resistance element. As a result, the temperature of the electric resistance element rises to the temperature suitable for regenerating the amine groups within a short time by resistance heating, so that the regeneration of amine groups can be carried out rapidly. Therefore, the cycle of carbon dioxide adsorption and regeneration can be shortened, so the size and weight of the carbon dioxide adsorption apparatus can be reduced even when a large amount of carbon dioxide is treated, making it suitable for installation in an aircraft. Furthermore, because the strength of the carbon dioxide adsorption element is increased by the electric resistance element, the element is easy to handle and degradation caused by vibrations or the like can be prevented. When the electric resistance element is sandwiched by sandwiching sections made from aluminum or aluminum alloy, the amine groups can be uniformly heated and the degradation of amine groups caused by excess heating or insufficient regeneration thereof caused by insufficient heating can be prevented because aluminum or aluminum alloy has excellent thermal conductivity.

The carbon dioxide adsorption apparatus in accordance with the present invention comprises a carbon dioxide adsorption element for adsorbing carbon dioxide contained in air and a coil for generating alternating magnetic flux, in which the carbon dioxide adsorption element comprises a support member, a porous film covering the support member, and amine groups clinging to the inner surface of each pore of the film for carbon dioxide adsorption, wherein the support member includes an element that is heated by electric energy, and carbon dioxide adsorbed by the amine groups is released by heating the element. In this case, it is preferable that the element is an electrically conductive element that has electrical conductivity and is disposed in the position through which the magnetic flux generated by the coil passes, and carbon dioxide adsorbed by the amine groups is released by induction heating of the electrically conductive element.

As a result, the temperature of the electrically conductive element rises to the temperature suitable for regenerating the amine groups within a short time by induction heating, so that the regeneration of amine groups can be carried out rapidly. Therefore, the cycle of carbon dioxide adsorption and regeneration can be shortened, so the size and weight of the carbon dioxide adsorption apparatus can be reduced even when a large amount of carbon dioxide is treated, making it suitable for installation in an aircraft. Furthermore, because the strength of the carbon dioxide adsorption element is increased by the electrically conductive element, the element is easy to handle and degradation caused by vibrations or the like can be prevented. When the electrically conductive element is made from aluminum or aluminum alloy, the amine groups can be uniformly heated and the degradation of amine groups caused by excess heating or insufficient regeneration thereof caused by insufficient heating can be prevented because aluminum or aluminum alloy has excellent thermal conductivity.

When the support member has an electric resistance element or electrically conductive element, it is preferable that a temperature detection unit of the carbon dioxide adsorption element and a controller for controlling power supply to the electric resistance element or coil for generating magnetic flux based on the detected temperature are provided. Furthermore, when the electric resistance element is resistance heated or when the electrically conductive element is induction heated, it is preferable that a heating unit is provided for heating the air for regeneration, which flows in the air flow path configured by the carbon dioxide adsorption element. As a result, temperature fluctuations of the carbon dioxide adsorption element are reduced, the regeneration proceeds gradually, and temperature can be easily controlled within a range in which the amine groups are not degraded.

It is preferable that a large-diameter pore disposed at the surface and a plurality of small-diameter pores opened in the bottom section of the large-diameter pore are provided as each pore formed in the film. Due to the presence of the large-diameter pore, the flow of air along the surface of the carbon dioxide adsorption element can be changed and the introduction of carbon dioxide molecules into the pores surrounded by the amine groups can be enhanced.

It is preferable that the inner diameter of the pore surrounded by the amine groups clinging to the inner surface of each pore of the film is 2 nm to 100 nm. When the inner diameter of the pore surrounded by the amine groups is 2 nm or more, a structure is obtained in which the size of gas molecule is less than that of the pore by an order of magnitude and the gas molecule can easily enter the pore surrounded by the amine groups and exit therefrom, so that the gas molecules can easily enter the pores surrounded by the amine groups at the time of adsorption; when the inner diameter of the pore is 100 nm or less, the gas molecules have plenty opportunities to come into contact with the amine groups, and carbon dioxide can be adsorbed with good efficiency without consuming much energy because a sufficient surface area of the amine groups can be ensured.

When the large-diameter pore and small-diameter pores are provided as each pore formed in the film, the inner diameter of the pore surrounded by the amine groups clinging to the inner surface of the small-diameter pore can be 2 nm to 100 nm, and the inner diameter of the pore surrounded by the amine groups clinging to the inner surface of the large-diameter pore can be more than 100 nm. It is preferable that the inner diameter of the pore surrounded by the amine groups clinging to the inner surface of the small-diameter pore is set to a value suitable for adsorption, because the amine groups clinging to the inner surface of the small-diameter pores take a large portion of the surface area of the carbon dioxide adsorption element.

With the carbon dioxide adsorption element and carbon dioxide adsorption apparatus in accordance with the present invention, a large amount of carbon dioxide can be rapidly adsorbed, and the amine groups for carbon dioxide adsorption can be rapidly and uniformly regenerated with high-temperature air; and the carbon dioxide adsorption element in accordance with the present invention can be provided by using the method in accordance with the present invention.

BRIEF DESCRIPTION OF THE DRAWINGS

FIG. 1 A structural explanatory drawing of an air conditioning device for an aircraft in an embodiment of the present invention FIG. 2 A perspective view of a moisture adsorption section of an air conditioning device for the aircraft in the embodiment of the present invention FIG. 3 A structural explanatory drawing of a carbon dioxide adsorption apparatus in the embodiment of the present invention FIG. 4 A side view of a carbon dioxide adsorption element in the embodiment of the present invention FIG. 5A A partially enlarged cross-sectional view of a carbon dioxide adsorption element in the embodiment of the present invention FIG. 5B A partially enlarged cross-sectional view of the carbon dioxide adsorption element prior to clinging of the amine groups in the embodiment of the present invention FIG. 5C A partially enlarged perspective view of the carbon dioxide adsorption element prior to clinging of the amine groups in the embodiment of the present invention FIG. 6A A partially enlarged cross-sectional view of a carbon dioxide adsorption element prior to clinging of the amine groups in the first modification example of the present invention FIG. 6B A partially enlarged cross-sectional view of a carbon dioxide adsorption element of the first modification example of the present invention FIG. 7 An illustration of a method for forming the support member of the carbon dioxide adsorption element in the embodiment of the present invention FIG. 8 An illustration of a method for forming the support member of the carbon dioxide adsorption element of the second modification example of the present invention FIG. 9 An illustration of a method for forming an aluminum oxide film for the carbon dioxide adsorption element in the embodiment of the present invention FIG. 10 A drawing of the support member wound in a shape of roll with the film formed thereon of the carbon dioxide adsorption element in the embodiment of the present invention FIG. 11 An explanatory drawing illustrating a method for clinging the amine groups to a film of the carbon dioxide adsorption element in the embodiment of the present invention FIG. 12 A structural explanatory drawing of an adsorber container of the carbon dioxide adsorption element in the embodiment of the present invention FIG. 13 A front view illustrating the utilization mode of the carbon dioxide adsorption element in the third modification example of the present invention FIG. 14 A partial enlarged front view illustrating the utilization mode of the carbon dioxide adsorption element in the third modification example of the present invention FIG. 15 A perspective view illustrating the form of the carbon dioxide adsorption element of the fourth modification example of the present invention FIG. 16 A partial enlarged front view illustrating the form of the carbon dioxide adsorption element of the fourth modification example of the present invention FIG. 17 A perspective view of the carbon dioxide adsorption element of the fifth modification example of the present invention FIG. 18 A partial enlarged cross-sectional view of the carbon dioxide adsorption element of the sixth modification example of the present invention FIG. 19 An illustration of a method for forming the carbon dioxide adsorption element of the sixth modification example of the present invention FIG. 20 A perspective view for explaining the structure of the carbon dioxide adsorption element of the sixth modification example of the present invention FIG. 21 A structural explanatory drawing of the carbon dioxide adsorption apparatus of the seventh modification example of the present invention FIG. 22 A partial enlarged cross-sectional view of the carbon dioxide adsorption element of the eighth modification example of the present invention FIG. 23 An illustration of a method for forming the carbon dioxide adsorption element of the eighth modification example of the present invention FIG. 24 A perspective view of the carbon dioxide adsorption element of the ninth modification example of the present invention FIG. 25 A partial enlarged cross-sectional view of the carbon dioxide adsorption element of the ninth modification example of the present invention FIG. 26 A structural explanatory drawing of the carbon dioxide adsorption apparatus of the ninth modification example of the present invention Explanation Of Reference Numeral
110 carbon dioxide adsorption element
111, 211, 311, 411 support member
112 film
112$a$ pore
113 amine groups
211$a$, 311$a$ electric resistance element
313 power supply unit
411$a$ electrically conductive element
431 coil

BEST MODE FOR CARRYING OUT THE INVENTION

FIG. 1 illustrates an embodiment in which a carbon dioxide adsorption apparatus 100 using the carbon dioxide adsorption element in accordance with the present invention is employed in an air conditioning device 1 for an aircraft. In the air conditioning device 1 for an aircraft, the air extracted from an engine 1 is cooled with a heat exchanger called a precooler 2, and the air flow rate is controlled with a flow rate control valve 39, the degree of opening of which is designated by signals from a controller (not shown in the figure). The air extracted from the engine, flow rate of which is controlled by the flow rate control valve 39, is almost adiabatically compressed with a radial compressor 3. The air whose temperature is increased due to compression with the radial compressor 3 is cooled by external air passing through a ram air flow paths 9 in a main cooler 4 and a regenerative heat exchanger 4a, and guided into a water separator 7 for trapping water. When the aircraft is on the ground and the engine 1 is stopped, the air compressed with a high-pressure air supply unit 1' is used for air conditioning instead of the air extracted from the engine 1.

The air from which water is separated in the water separator 7 is guided to an air flow path 75. Part of the air flowing through the air flow path 75 is guided in an air separation unit 16. A selective permeability membrane 16a constituting the air separation unit 16 has a permeability of oxygen present in the air higher than a permeability of nitrogen. A selective permeability membrane with a permeability of oxygen lower than a permeability of nitrogen also can be used. As a result, the air introduced into the air separation unit 16 is separated into a nitrogen-enriched gas and an oxygen-concentrated air. The nitrogen-enriched gas is introduced into a fuel surrounding region 15 via a first control valve 41a and released to an external space 14 through a release path. The oxygen-concentrated air can be released to the external space 14 via a second control valve 41b and can be introduced into a cabin 8 via a third control valve 41c. The opening degree of each of control valves 41a, 41b, 41c is adjusted by signals from the controller, and the flow rate of air passing through the air separation unit 16 can be adjusted by the adjustment of the opening degree.

The remaining part of air introduced into the air flow path 75 is almost adiabatically expanded in an expansion turbine 5, thereby producing a cooling air. A cooling device of air cycle type is thus constituted by the compressor 3 and expansion turbine 5. The cooling air produced by the cooling device of air cycle type is introduced into a cabin 8 including a cockpit space of the aircraft from the regenerative heat exchanger 4a via a mixing chamber 13. The expansion work of the expansion turbine 5 is transferred via a shaft 6 to the compressor 3 and thus used as a compression power. A motor 6a for additionally providing a power necessary for driving the compressor 3 is mounted on the shaft 6 connecting the compressor 3 with the turbine 5.

A bypass air flow path 11 is provided for introducing the air extracted from the engine 1 into the cabin 8 without passing through the cooling device of air cycle type. The bypass air flow path 11 is opened and closed by a hot air modulation valve 12, degree of opening of which can be adjusted by signals from the controller. When the hot air modulation valve 12 is opened, part of the extracted air is introduced from the bypass air flow path 11 into the cabin 8 via the mixing chamber 13 without cooling in the cooling device of air cycle type constituted by the compressor 3 and expansion turbine 5.

The air inside the cabin 8 flows into an outflow air flow path 40 in an amount obtained by deducting the amount of fuselage leak air and released air from the air flow path to the outside of the aircraft from the amount of supplied air from the air conditioning device, and dust and odor are removed with a filter 42 in the outflow air flow path 40. Part of the air flowing into the outflow air flow path 40 is guided into the mixing chamber 13 via a fan F1.

Part of the air flowing out of the cabin 8 via the outflow air flow path 40 is guided with a fan F2 into a first auxiliary air flow path 71 branching from the outflow air flow path 40, and then heated with a second regenerative heat exchanger 72.

Moisture adsorption sections 83 are connected to the outflow air flow path 40 and first auxiliary air flow path 71 via an air flow path switching mechanism 50. Thus, as shown in FIG. 2, a large number of moisture adsorption sections 83 are provided like a honeycomb structure inside a rotary drum 80, and the longitudinal direction thereof is along the rotation axis direction. Adsorbing agent is included in each moisture adsorption section 83. The adsorbing agent constituting each moisture adsorption section 83 adsorb moisture contained in the air and release the adsorbed moisture when the temperature rises above that at the time of the adsorption process, and can be comprise of substance adsorbing water molecules, such as silica gel. Separators 81 are joined to both end surfaces of the rotary drum 80 rotatably via sealing members (omitted in the figure). Each separator 81 is constructed by connecting an outer ring 81a and an inner ring 81b with two arms 81c, and fixed to the fuselage of the aircraft. A central shaft 80a of the rotary drum 80 is rotatably supported via a bearing (omitted in the figure) by the inner ring 81b of each separator 81. A motor 82 is connected to the central shaft 80a, and the rotary drum 80 is rotated when the motor 82 is driven by signals from the controller 25. The space between the outer ring 81a and inner ring 81b in each separator 81 is separated into two regions 81d, 81e by two arms 81c. One region 81d in each separator 81 is connected to the first auxiliary air flow path 71 via a piping joint 84, and the other region 81e is connected to the outflow air flow path 40 via a piping joint 85. As a result, when the rotary drum 80 is rotated by the control of the air flow path switching mechanism 50 with the controller 25, each moisture adsorption section 83 is switched between a state of connection to the first auxiliary air flow path 71 and a state of connection to the outflow air flow path 40.

Owing to heating with second regenerative heat exchanger 72, the temperature of air flowing through the first auxiliary air flow path 71 becomes higher than that of the air inside the cabin 8, for example, 80° C.-120° C. On the other hand, the temperature of air guided from the cabin 8 into the outflow air flow path 40 becomes, for example, 20° C.-30° C. As a result, because the moisture adsorption sections 83 becomes a low temperature when the air introduced from the cabin 8 via the outflow air flow path 40 flows therethrough, the adsorbing agent adsorbs water molecules contained in the air flowing out of the cabin 8. On the other hand, because the moisture adsorption sections 83 becomes a high temperature when the air introduced via the first auxiliary air flow path 71 flows therethrough, the adsorbing agent is regenerated by the release of the adsorbed water molecules into the air introduced via the first auxiliary air flow path 71. For example, when the adsorbing agent is silica gel, water molecules are adsorbed in an amount of 0.25 kg or more by 1.0 kg of silica gel at a temperature of 20° C., but only not more than 0.02 kg of water molecules are adsorbed by 1.0 kg of silica gel at a temperature of 100° C. Therefore, after the water molecules contained in the air released from the cabin 8 have been adsorbed by the adsorbing agent, the water molecules are released into the air flowing through the first auxiliary air flow path 71. Moreover, the adsorbing agent is regenerated so as to be reused.

The air flowing through the first auxiliary air flow path 71 is guided into a third switching valve 27 after passing through the moisture adsorbing sections 83. The third switching valve 27 can switch the air flow path by signals from the controller between a state in which the air introduced thereinto is released into the space 14 outside the aircraft and a state in which the air is introduced into the cabin 8 via the mixing chamber 13. A unit is thereby constituted, in which the air flowing through the first auxiliary air flow path 71 can be introduced into the cabin 8 after passing through the moisture adsorbing section 83 and the moisture adsorbed by the moisture adsorbing sections 83 is introduced into the cabin 8.

The outflow air flow path 40 is branched into a second auxiliary air flow path 95 and third auxiliary air flow path 96 at downstream area of the moisture adsorbing units 83. The second auxiliary air flow path 95 is connected to a compressor 17 that is driven by a high-frequency motor 18 as air compression means, and part of the air from which the moisture has been adsorbed by the moisture adsorbing sections 83 is almost adiabatically compressed. The air whose temperature is increased to about 150° C.-200° C. by being pressurized with the compressor 17 is subjected to heat exchange with the air flowing through the first auxiliary air flow path 71 in the second regenerative heat exchanger 72, and cooled with the external air passing through the ram air flow path 9 in a radiator 19, whereby it is cooled to a temperature close to normal temperature; this air is thereafter introduced into the carbon dioxide adsorption apparatus 100, where carbon dioxide contained therein is adsorbed and removed. The air from which the carbon dioxide has been removed is mixed with the air extracted from the engine and introduced into a radial compressor 3 via a fourth switching valve 36. Because gas containing a very small amount of amine groups can be mixed with the air in the carbon dioxide adsorption apparatus under a certain operation condition, it is preferred that an easy adsorption filter 103 using active carbon or the like is installed before the fourth switching valve 36. On the other hand, part of the air flowing through the first auxiliary air flow path 71 is heated in the second regenerative heat exchanger 72, and then introduced into the carbon dioxide adsorption apparatus 100 via a branch flow path 71a so as to be used therein as high-temperature air for regeneration. The third auxiliary air flow path 96 is connected to the outflow valve 90b via a switching valve 90a. The switching valve 90a is switched between a state in which the outflow valve 90b is connected to the third auxiliary air flow path 96 and a state where the outflow valve 90b is connected to the cabin 8. The opening degree of the outflow valve 90b is controlled by the controller based on the pressure inside the cabin 8 and aircraft altitude respectively detected with sensors not shown in the figures, and the pressure inside the cabin 8 is appropriately maintained.

As shown in FIG. 3, the carbon dioxide adsorption apparatus 100 has a plurality of adsorber containers 101. The inlet port 101a and outlet port 101b of each adsorber container 101 can be selectively connected to the branch flow path 71a of the first auxiliary air flow path 71 and to the second auxiliary air flow path 95 via respective electromagnetic switching valve 102a, 102b. As a result, the adsorber containers 101 can be selectively connected to the branch flow path 71a and second auxiliary air flow path 95 by control of the electromagnetic switching valve 102a, 102b by the controller 25.

A carbon dioxide adsorption element 110 is accommodated in each adsorber container 101. As shown in FIG. 4, the carbon dioxide adsorption element 110 in the present embodiment has a shape of a radiation fin, and, as shown in FIG. 5A, comprises a foil-like support member 111 made from aluminum or aluminum alloy, porous aluminum oxide ($Al_2O_3$) films 112 formed by oxidation of the surface layers of the support member 111, and amine groups 113 clinging to the inner surface of each pore 112a of the films 112. The amine groups 113 adsorb carbon dioxide molecules contained in the air, and release the adsorbed carbon dioxide molecules when the temperature rises above that at the time of the adsorption process. The depth direction of each pore 112a of the films 112 is the thickness direction (direction of arrow A in FIG. 5A) of the support member 111. The inner diameter D of pore surrounded by the amine groups 113 clinging to the inner surface of each pore 112a of the films 112 is 2 nm to 100 nm. The aluminum oxide films 112 are formed on the surface layers of the support member 111, as shown in FIG. 5B, by using the support member 111 as an anode and passing an electric current through an acidic treatment liquid, and thus the films grow in the direction shown by an arrow in the figure. In other words, because the films 112 grow in the thickness direction of the support member 111, the depth direction of each pore 112a of the films 112 becomes the thickness direction of the support member 111. The forming of such anodization films 112 can be carried out by a known process. The films 112 of uniform quality having pores 112a suitable for adhesion of the amine groups 113 can be formed by controlling the parameters such as type, concentration, and temperature of the electrolyte 133 and the applied electric current. In particular, the thickness ("t" in the figure) of the oxidation layer that constitutes the film 112 is determined by the type of the treatment liquid used and the voltage applied during the treatment, and the thickness of the oxidation layer generally decreases with the decrease in the voltage. It is preferred that acid whose principal ingredient is dilute sulfuric acid or the like is used for the treatment liquid to form the pores with the above-described inner diameter D according to the present invention. After the growth of the films 112 has been completed as shown in FIG. 5C, the surface layers most often have honeycomb structure, in which the grown portions from adjacent regions of the films 112 are densely distributed. It goes without saying that the openings of pores 112a are not closed.

As shown in the first modification example shown in FIG. 6A and FIG. 6B, the thickness of the aluminum oxidation layers, that is, the thickness of the films 112 is changed by decreasing the treatment voltage in the process of forming the films 112. As a result, the pores formed in the films 112 can be grown as large-diameter pores 112b at the surface and a plurality of small-diameter pores 112a opened in the bottom section of the large-diameter pore 112b. In this case, because the amine groups 113 clinging to the inner surface of the small-diameter pores 112a take a large portion of the surface area of the carbon dioxide adsorption element 110, it is preferred that the inner diameter D of the pore surrounded by the amine groups 113 clinging to the inner surface of the small-diameter pore 112a is 2 nm to 100 nm, this range being suitable for adsorption. The inner diameter of pore surrounded by the amine groups 113 clinging to the inner surface of the large-diameter pore 112b can exceed 100 nm. The presence of large-diameter pores 112b changes the flow of air along the surface of the carbon dioxide adsorption element 110 and can enhance the introduction of carbon dioxide molecules into the pores surrounded by the amine groups 113.

As shown in FIG. 7, the support member 111 of the present embodiment is formed by bending an aluminum foil 111' so that a large number of fin sections 111a are formed, with a pair of molding dies 121 alternately reciprocating in the thickness direction of the aluminum foil 111' unreeled from a roll R. As shown by arrows in FIG. 7, the aluminum foil 111' is unreeled from the roll R by the reciprocation of the molding dies 121 in the unreeling direction of the aluminum foil 111'. The thickness of the support members 111 formed by such a process is preferably about 0.05 mm to 0.1 mm. As shown by the second modification example illustrated by FIG. 8, a reinforcing material 120 in the shape of a thin sheet made from aluminum or aluminum alloy and having a thickness slightly larger than that of the support member 111 can be mounted on the support member 111. The reinforcing member 120 is unreeled from a roll R' via a roller 124, positioned in the location of bonding to the support member 111 after powdered solder 123 has been sprayed thereon with a nozzle 122, and attached to the support member 111 by melting the solder 123 with a heating device 125. The thickness of the reinforcing member 120 is, for example, about 0.3 mm. In order to prevent aluminum or aluminum alloy constituting the support member 111 from oxidizing during melting of the solder 123, it is preferred that a sealing wall 127 surrounding the heating zone of the support member 111 that is heated with the heating device 125 is provided and that the heating zone is covered with a cooling gas atmosphere produced by supplying inert gas 126 such as argon. No specific limitation is placed on the shape of the support member 111, provided that it is suitable for operation.

The aluminum oxide films 112 of the present embodiment are formed by conducting anodization treatment of the support member 111 after the fin sections 111a have been formed. The thickness of the film 112 is preferably from several microns to several tens of microns. To be more precise, as shown in FIG. 9, the support member 111 is fed by a rotary roller 131 into an electrolyte 133 such as sulfuric acid in a container 132, a power source 134 is connected to the support member 111 and container 132 by using the support member 111 as an anode, the surface layers of the support member 111 are oxidized by supplying electric power from the power source 134, and the porous aluminum oxide films 112 are formed.

The process of forming a large number of fin sections and the anodization treatment process can be carried out not only in the above-described order but also in the reversed order.

In the present embodiment, the support member 111 having the films 112 formed on the surface thereof is accommodated in a container 135 as shown in FIG. 11, after being wound like a roll as shown in FIG. 10. A solution obtained by dissolving polymer agent such as polyethylene imine, which has a large number of amine groups 113, into a volatile solvent is poured into the container 135, and the support member 111 having the films 112 formed thereon is completely immersed into the solution. The container 135 is then closed and degassed with a vacuum pump or the like. As a result, the air remaining inside the pores 112a of the films 112 is sucked in, so that the solution instead of the air is introduced into the pores 112a by pressurization or the like, and the amine groups 113 cling to the inner surface of each pore 112a by drying the solution. The roll-shaped carbon dioxide adsorption element 110 formed in the above-described manner is accommodated in the adsorber container 101 as shown in FIG. 12. The adsorber container 101 has a tubular shape, and the air inlet port 101a and outlet port 101b are provided at respective ends thereof By setting the axial direction of the adsorber container 101 parallel to the surface of the support member 111, the air inside the adsorber container 101 flows along the surface of the support member 111.

When the inlet port 101a and outlet port 101b of the adsorber container 101 are connected to the second auxiliary air flow path 95, the temperature of air flowing in the adsorber container 101 is normal temperature because it is cooled at upstream area; therefore, carbon dioxide contained in the air is adsorbed by amine groups 113. When the inlet port 101a and outlet port 101b of the adsorber container 101 are connected to the branch flow path 71a of the first auxiliary air flow path, the temperature of air flowing in the adsorber container 101 rises to about 80° C.-120° C. as described above; therefore, carbon dioxide adsorbed by the amine groups 113 is released and the amine groups 113 are regenerated so as to be reused.

The air flowing out of the outlet port 101b of the adsorber container 101 through the second auxiliary air flow path 95 is guided into a fourth switching valve 36. The fourth switching valve 36 can switch the air flow path by signals from the controller between a state in which the introduced air is introduced into the cabin 8 via the mixing chamber 13 and a state in which the air is introduced into the cooling device of air cycle type. As a result, the air flowing out of the cabin 8 is again introduced into the cabin 8 via the fourth switching flow valve 36 after the carbon dioxide in the air has been reduced.

The air containing a large amount of carbon dioxide that flows out of the outlet port 101b of the adsorber container 101 through the branch flow path 71a of the first auxiliary air flow path is discharged into the space 14 outside the aircraft via a pressure reduction valve 91g'. At this time, the amount of discharged air can be controlled in the pressure reduction valve 91g' by signals from the controller 25.

According to the above-described embodiment, when the air flowing out of the cabin 8 is again introduced into the cabin 8, carbon dioxide contained in the air is discharged to the outside of the aircraft via the carbon dioxide adsorption element 110, and the carbon dioxide in the air inside the aircraft can be reduced. At this time, because the foil-like support member 111 is thin, the resistance to the flow of air can be reduced and the adsorption of carbon dioxide contained in the air can be performed rapidly without increasing the pressure loss in the air flow path constituted by the carbon dioxide adsorption element 110, by causing the air to flow along the surface of the support member 111 in the air flow path. Furthermore, because the amine groups 113 can adsorb carbon dioxide contained in the air and can release the adsorbed carbon dioxide when the temperature rises above that at the time of adsorption process, the amine groups 113 can be regenerated by causing the high-temperature air to flow in the air flow path. Because the support member 111 is made from aluminum or aluminum alloy with excellent thermal conductivity, even if it is heated locally, the heat is diffused and degradation due to increase in temperature is prevented; therefore, it is heated so that a uniform temperature distribution is achieved and the amine groups 113 can be heated uniformly and rapidly to a temperature suitable for regeneration by the heat of the high-temperature air. Furthermore, because the support member 111 is thin and light weight, the carbon dioxide adsorption element 110 is reduced in size and weight; moreover, the structure thereof is simplified and it can function normally even in an environment where it is subjected to shaking, vibrations, and acceleration. Furthermore, when the inner diameter of pore surrounded by the amine groups 113 clinging to the inner surface of the pore 112a of the aluminum oxide film 112 on the surface of the support member 111 is made 2 nm or more, gas molecules can easily enter the pore, and when the inner diameter is 100 nm or less, a sufficient surface area of amine groups 113 can be ensured and carbon dioxide can be adsorbed with good efficiency without consuming much energy. Furthermore, the air inside the aircraft compressed by the compressor 17 can be effectively used as high-temperature air for regenerating the amine groups 113. Therefore, an excellent carbon dioxide adsorption apparatus 100 for improving the air inside the cabin 8 of the aircraft accommodating a large number of passengers can be realized. As a result, the amount of fresh air that is taken in from outside the aircraft in flight can be reduced, so that energy consumed to compress the fresh air can be reduced.

The shape of the carbon dioxide adsorption element 110 in use is not limited to a roll. For example, as shown in the third modification example in FIG. 13 and FIG. 14, a plurality of carbon dioxide adsorption elements 110 having a large number of fin sections 111*a* can be stacked via reinforcing members 120 and accommodated inside the adsorber container 101.

As shown in the fourth modification example in FIG. 15 and FIG. 16, portions 111*a'* shifted in the direction perpendicular to the air flow direction (the direction of arrow F shown in FIG. 15, the direction F is perpendicular to the paper sheet in FIG. 16) can be formed in the respective fin sections 111*a* of the carbon dioxide adsorption element 110 at intervals in the air flow direction so that the contact probability between the air and amine groups 113 is increased.

The carbon dioxide adsorption apparatus 100 can also employ a configuration corresponding to that of the moisture adsorbing device as shown in FIG. 2 rather than that comprised of the split containers as shown in FIG. 3. In this case, a roll-shaped carbon dioxide adsorption element 110 similar to that of the above-described embodiment is used as shown in the fifth modification example in FIG. 17 instead of the moisture adsorption sections 83, in which the high-temperature air is introduced from the branch flow path 71*a* of the first auxiliary air flow path 71 into the region 81*d*, and the air flowing out of the cabin 8 is introduced into the region 81*e* via the outflow air flow path 40.

The carbon dioxide adsorption element 110 of the sixth modification example is shown in FIG. 18. In the carbon dioxide adsorption element 110 of the present modification example, a bendable plate-like support member 211 is provided instead of the foil-like support member 111 of the above-described embodiment. The support member 211 is covered with porous aluminum oxide films 112 similar to those of the above-described embodiment. The support member 211 has an electric resistance element 211*a* comprised of a metal mesh having electrical conductivity as an element that is heated by electric energy, insulator 211*b* covering the electric resistance element 211*a*, and sandwiching sections 211*c* for sandwiching the electric resistance element 211*a* via the insulator 211*b*. The sandwiching sections 211*c* of the present modification examples are comprised of aluminum or aluminum alloy foils. Metal having comparatively high electric resistance is preferably used as material for the electric resistance element 211*a*; for example, a stainless steel comprising a large amount of Ni and Cr can be used. Ceramic such as silicon dioxide or silicon carbide can be used as material for the insulator 211*b*. The sandwiching sections 211*c* are integrated with the insulator 211*b* via adhesive 211*d*. The porous aluminum oxide films 112 similar to those of the above-described embodiment are formed by anodic oxidation of aluminum or aluminum alloy of the surface layers of the sandwiching sections 211*c*. The amine groups 113 cling to the inner surface of each pore 112*a* of the films 112. The size of each pore 112*a* can be the same as in the above-described embodiment. Furthermore, large-diameter pores 112*b* and small-diameter pores 112*a* can be provided in the same manner as in the first modification example.

FIG. 19 illustrates a process of forming the carbon dioxide adsorption element 110 of the sixth modification example. The electric resistance element 211*a* unreeled from a roll is introduced into a vacuum container 221, and the insulator 211*b* is evaporated on the electric resistance element 211*a* inside the vacuum container 221, then the adhesive 211*d* is sprayed from a sprayer 222 onto the insulator 211*b*, the sandwiching sections 211*c* unreeled from rolls are bonded to both surfaces of the insulator 211*b* via the adhesive 211*d*, and the adhesive 211*d* is cured by heating with the heating rollers 223, thereby the plate-like support member 211 is formed. The support member 211 is then introduced into an electrolyte 133 such as sulfuric acid in the container 132 via a guide rollers in the same manner as in the above-described embodiment, and the surface layers of the support member 211 are subjected to anodic oxidation, thereby the porous aluminum oxide films 112 covering the support member 211 are formed. The support member 211 covered with the films 112 is then introduced via a guide rollers into solution 227 comprising amine groups in a container 226, the amine groups 113 cling to the inner surface of each pore 112*a* of the films 112, and a long plate-like carbon dioxide adsorption element 110 manufactured in this manner is dried with the heater 228. End sections of the electric resistance element 211*a* are exposed at both ends of the carbon dioxide adsorption element 110 for the below-described connection to the electrodes 231, 232.

A carbon dioxide adsorption apparatus 100 using the carbon dioxide adsorption element 110 of the sixth modification example is shown in FIG. 20. The adsorption apparatus 100 comprises a tubular adsorber container 101 accommodating the carbon dioxide adsorption element 110. Similarly to the above-described embodiment, the inlet port 101*a* at one end and the outlet port 101*b* at the other end of the adsorber container 101 can be selectively connected to the branch flow path 71*a* of the first auxiliary air flow path 71 and the second auxiliary air flow path 95 via the respective electromagnetic switching valves 102*a*, 102*b*. Inside the adsorber container 101, the carbon dioxide adsorption element 110 is bent along the axial direction of the adsorber container 101 at plural sections, and the air inside the adsorber container 101 flows along the surface of the support member 211. An electrode 231 connected to one end of the electric resistance element 211*a* and an electrode 232 connected to the other end thereof are mounted on the adsorber container 101. The electric resistance element 211*a* is connected via the two electrodes 231, 232 to a power supply unit 233 for resistance heating. Furthermore, a temperature detection unit 234 for detecting the surface temperature of the carbon dioxide adsorption element 110 is mounted on the adsorber container 101, the temperature measurement signal obtained with the temperature detection unit 234 is converted with the operation circuit 235 into a digital signal, and transmitted to the controller 25 connected to the power supply unit 233. For example, a non-contact type sensor for measuring the quantity of infrared rays radiation or a contact type resistance thermometer can be used as the temperature detection unit 234. The controller 25 controls the power supply unit 233 by ON/OFF control, current quantity control or the like based on the measured temperature, and the power supplied to the electric resistance element 211*a* is thereby controlled. Other aspects of this modification example are identical to those of the above-described embodiment, and the identical components are assigned with identical symbols.

When the inlet port 101*a* and outlet port 101*b* of the adsorber container 101 are connected to the second auxiliary air flow path 95, carbon dioxide contained in the air is adsorbed by the amine groups 113 similarly to the above-described embodiment, because the temperature of air flowing in the adsorber container 101 becomes almost the normal temperature. When the inlet port 101*a* and outlet port 101*b* of the adsorber container 101 are connected to the branch flow path 71*a* of the first auxiliary air flow path, carbon dioxide adsorbed by the amine groups 113 is released due to resistance heating of the electric resistance element 211*a* to which power is supplied from the power supply unit 233. The air containing the released carbon dioxide is discharged to the space 14 outside the aircraft via the pressure reducing valve 91g'.

As shown in the seventh modification example in FIG. 21, the insulator 211b can be previously attached on the surface of the electric resistance element 211a by thermal spraying or the like, and the sandwiching sections 211c can be integrated by using another means such as soldering instead of the adhesive 211d so that the previously integrated electric resistance element 211a and insulator 211b are sandwiched.

FIG. 22 shows the carbon dioxide adsorption element 110 of the eighth modification example. The carbon dioxide adsorption element 110 of the present modification example comprises a bendable thin plate-like support member 311 instead of the foil-like support member 111 of the above-described embodiment. The support member 311 is covered with porous aluminum oxide films 112 similar to those of the above-described embodiment. The support member 311 has an electric resistance element 311a comprised of a thin plate having electrical conductivity and has sandwiching sections 311b made from aluminum or aluminum alloy for sandwiching the electric resistance element 311a. The material of the electric resistance element 311a is identical to that of the electric resistance element 211a of the sixth modification example. The sandwiching sections 311b are integrated with the surface of the electric resistance element 311a by vapor deposition, hot-dip coating or the like. Porous aluminum oxide films 112 similar to those of the above-described embodiment are formed by anodization of aluminum or aluminum alloy of almost the entire region of the sandwiching sections 311b. Amine groups 113 cling to the inner surface of each pore 112a of the films 112. The dimensions of each pore 112a can be identical to those of the above-described embodiment. Furthermore, similarly to the first modification example, large-diameter pores 112b and small-diameter pores 112a can be provided.

FIG. 23 illustrates a process of forming the carbon dioxide adsorption element 110 of the eighth modification example. The electric resistance element 311a unreeled from the roll is introduced into a vacuum container 321, and the sandwiching sections 311b are formed by performing vapor deposition of aluminum or aluminum alloy on the electric resistance element 311a inside the vacuum container 321, thereby a plate-like support member 311 is formed. The support member 311 is then introduced into the electrolyte 133 such as sulfuric acid in the container 132 via guide rollers in the same manner as in the above-described embodiment, the surface layers of the support member 311 are subjected to anodic oxidation, and thus the porous aluminum oxide films 112 covering the support member 311 are formed. In the present modification example, the aluminum oxide films 112 function as insulator. Then, the support member 211 covered with the films 112 is introduced via guide rollers into solution 227 comprising amine groups in a container 226 similar to that of the sixth modification example, the amine groups 113 cling to the inner surface of each pore 112a of the films 112, and a long plate-like carbon dioxide adsorption element 110 manufactured in this manner is dried with the heater 228. End sections of the electric resistance element 311a are exposed at both ends of the carbon dioxide adsorption element 110 for connection to the electrodes 231, 232 in the same manner as in the sixth modification example. The carbon dioxide adsorption element 110 of the eighth modification example can be used in the same manner as the carbon dioxide adsorption element 110 of the sixth modification example in the same carbon dioxide adsorption apparatus 100. Other aspects of this modification example are identical to those of the above-described embodiment, and the identical components are assigned with identical symbols.

The plate-like carbon dioxide adsorption element 110 of the ninth modification example shown in FIG. 24 has an annular shape. As shown in FIG. 25, in the carbon dioxide adsorption element 110 of the present modification example, a bendable thin plate-like support member 411 is provided instead of the foil-like support member 111 of the above-described embodiment. The support member 411 is covered with porous aluminum oxide films 112 similar to those of the above-described embodiment. The support member 411 has an electrically conductive element 411a comprised of a thin plate having electrical conductivity as an element to be heated by electric energy, and sandwiching sections 411b made from aluminum or aluminum alloy for sandwiching the electrically conductive element 411a. No specific limitation is placed on the material of the electrically conductive element 411a, provided that it can generate heat by induction heating; in the present modification example, this material is stainless steel. The sandwiching sections 411b are integrated with the surface of the electrically conductive element 411a by vapor deposition. Porous aluminum oxide films 112 similar to those of the above-described embodiment are formed by anodization of aluminum or aluminum alloy of almost the entire region of the sandwiching sections 411b. Amine groups 113 cling to the inner surface of each pore 112a of the films 112. The dimensions of each pore 112a can be identical to those of the above-described embodiment. Furthermore, similarly to the first modification example, large-diameter pores 112b and small-diameter pores 112a can be provided. The carbon dioxide adsorption element 110 of the present modification example can be manufactured by being formed into a shape of long plate in the same manner as in the eighth modification example and then by being blanked with a press in an annular shape. Because the electrically conductive element 411a only have to generate heat by induction heating, it can be made from aluminum or aluminum alloy if the frequency of the induction magnetic field is set high. In this case, because the porous aluminum oxide films 112 similar to those of the above-described embodiment can be obtained by anodizing the surface layers of the electrically conductive element 411a, the sandwiching sections 411b become unnecessary.

A carbon dioxide adsorption apparatus 100 using the carbon dioxide adsorption element 110 of the ninth modification example is shown in FIG. 26. The adsorption apparatus 100 comprises a tubular adsorber container 101 accommodating the carbon dioxide adsorption element 110; the inlet port 101a at one end and the outlet port 101b at the other end of the adsorber container 101 can be selectively connected to the branch flow path 71a of the first auxiliary air flow path 71 and the second auxiliary air flow path 95 via the respective electromagnetic switching valves 102a, 102b.

A plurality of carbon dioxide adsorption elements 110 are stacked with a certain spacing therebetween in the adsorber container 101. When the carbon dioxide adsorption elements 110 are stacked, gaps constituting air flow paths between the surfaces of the stacked carbon dioxide adsorption elements 110 can be ensured by forming a large number of protrusions projecting from the surfaces of the carbon dioxide adsorption elements 110 or by inserting spacers such as three-dimensional meshes. A large number of protrusions projecting from the surfaces of the carbon dioxide adsorption elements 110 can be formed by providing peaks and valleys on the support member 411 by pressing or the like prior to forming the films 112. An air introducing tube 101c communicating with the inlet port 101a and an air discharge tube 101d communicating with the outlet port 101b are fixed to the adsorber container 101. The stacked carbon dioxide adsorption elements 110 are sandwiched between a flange 101c' provided on the outer periphery of the air introducing tube 101c and a flange 101d' provided on the outer periphery of the air discharging tube 101d. Furthermore, the stacked carbon dioxide adsorption elements 110 are divided by a partition plate 101e in two sides: an air introduction side and an air discharge side. The partition plate 101e allows magnetic flux to pass therethrough and regulates the flow of air through the central holes of the carbon dioxide adsorption elements 110. The air introducing tube 101c is inserted into the central hole of each carbon dioxide adsorption element 110 on the air introduction side, and the part of the air introducing tube 101c inserted into the central holes is porous. The air discharging tube 101d is inserted into the central hole of each carbon dioxide adsorption element 110 on the air discharge side, and the part of the air discharging tube 101d inserted into the central holes is porous.

The air introduced into the adsorber container 101 from the inlet port 101a via the air introducing tube 101c flows from the central holes of carbon dioxide adsorption elements 110 on the air introduction side into the gaps between the carbon dioxide adsorption elements 110 via the pores of the air introducing tube 101c, and flows toward the peripheral wall of the adsorber container 101 along the surfaces of the support members 411, and then flows along the peripheral wall of the adsorber container 101; as a result, the air reaches the outer periphery of each carbon dioxide adsorption element 110 on the air discharge side, and then flows from the outer periphery of each carbon dioxide adsorption element 110 on the air discharge side into the gaps between the carbon dioxide adsorption elements 110, and flows toward the central holes of the carbon dioxide adsorption elements 110 along the surfaces of the support members 411, so that it reaches the central holes of the carbon dioxide adsorption elements 110 via the pores of the air discharging tube 101d, and thereafter the air is discharged from the outlet port 101b via the air discharging tube 101d.

A coil 431 for generating alternating magnetic flux is embedded in the peripheral wall of the adsorber container 101. The coil 431 is connected to a high-frequency power source 432 and generates a high-frequency alternating magnetic flux shown by a dot-dash line m1 when a high-frequency alternating current is applied thereto. The frequency of the alternating current generated by the high-frequency power source 432 is set to several tens of kilohertz. A conductive wire constituting the coil 431 is preferably composed of a large number of fine wires, and the high-frequency alternating current flows through the surface of each wire. A magnetic material for leading the magnetic flux passing through the carbon dioxide adsorption elements 110 is preferably disposed outside the peripheral wall of the adsorber container 101. A ferrite, in which generation of eddy current is low level, is preferred as the magnetic material. The electrically conductive element 411a of each support member 411 is disposed in the passage position of the magnetic flux generated by the coil 431, so that the magnetic flux passes through along the thickness direction of the electrically conductive element 411a.

A temperature detection unit 234 identical to that of the sixth modification example is mounted on the adsorber container 101 to detect the surface temperature of the carbon dioxide adsorption elements 110. The temperature measurement signal detected by the temperature detection unit 234 is converted into a digital signal by an operation circuit 235 and transmitted to the controller 25, and the alternating power source 432 is connected to the controller 25. The controller 25 controls the alternating power source 432 by ON/OFF control, current quantity control or the like based on the measured temperature, and the power supplied to the coil 431 is thereby controlled. Other aspects of this modification example are identical to those of the above-described embodiment, and the identical components are assigned with identical symbols.

When the inlet port 101a and outlet port 101b of the adsorber container 101 are connected to the second auxiliary air flow path 95, carbon dioxide contained in the air is adsorbed by the amine groups 113 similarly to the above-described embodiment, because the temperature of air flowing in the adsorber container 101 becomes almost the normal temperature. When the inlet port 101a and outlet port 101b of the adsorber container 101 are connected to the branch flow path 71a of the first auxiliary air flow path, the electrically conductive element 411a is induction heated by eddy current because the high-frequency alternating magnetic flux is generated by the coil 431. Carbon dioxide adsorbed by the amine groups 113 is released due to the induction heating of the electrically conductive element 411a. The air containing the released carbon dioxide is discharged to the space 14 outside the aircraft via the pressure reducing valve 91g'. In the present modification example, the adsorption surface area of the carbon dioxide adsorption elements 110 is small in the vicinity of the central holes and large in the vicinity of the outer periphery thereof. Accordingly, when the adsorption saturation zone gradually increases from the upstream side of the air flow to the downstream side; in other words, when the adsorption saturation advances, this advance is accelerated at the final stage. Furthermore, when the carbon dioxide is released from the carbon dioxide adsorption elements 110, the advance of carbon dioxide release is also accelerated at the final stage. Therefore, the advancement of carbon dioxide adsorption and release can be easily controlled.

According to the carbon dioxide adsorption elements 110 of the sixth to ninth modification examples, the temperature of the electric resistance elements 211a, 311a and the temperature of the electrically conductive element 411a are risen to the temperature suitable for regenerating the amine groups 113 within a short period by resistance heating and induction heating, respectively. As a result, the regeneration of amine groups 113 can be carried out rapidly; therefore, the cycle of carbon dioxide adsorption and regeneration can be shortened and the number of adsorption and regeneration cycles per unit time can be increased. As a result, even when a large amount of carbon dioxide is treated, the size and weight of the carbon dioxide adsorption apparatus 100 can be reduced, making it suitable for installation at the aircraft. Because the amount of heat generated by the electric resistance elements 211a, 311a and electrically conductive element 411a is controlled with the controller 25, the surface temperature of the carbon dioxide adsorption element 110 can be maintained at a level suitable for regenerating the amine groups 113. In this case, because the temperature of air flowing inside the adsorber container 101 is risen to a temperature suitable for regenerating the amine groups 113, which is about 80° C.-120° C. as shown in the above-described embodiment, temperature fluctuations of the carbon dioxide adsorption element 110 are reduced. As a result, the temperature control for performing sufficient regeneration can be easily conducted with preventing the carbon dioxide adsorption element 110 from degradation. Furthermore, because the strength of the carbon dioxide adsorption element 110 is increased by the electric resistance elements 211a, 311a or electrically conductive element 411a, the element 110 is easy to handle and degradation caused by vibrations or the like can be prevented. When the electric resistance elements 211a, 311a or electrically conductive element 411a is sandwiched by sandwiching sections 211c, 311b made from aluminum or aluminum alloy, because aluminum or aluminum alloy has excellent thermal conductivity, the amine groups 113 can be uniformly heated. As a result, the degradation of amine groups 113 caused by excess heating or insufficient regeneration thereof caused by insufficient heating can be prevented. The electric resistance elements 211a, 311a or electrically conductive element 411a itself can be made from aluminum or aluminum alloy; in this case, the electric resistance elements 211a, 311a or electrically conductive element 411a is preferably made thin to increase the electric resistance thereof.

In the carbon dioxide adsorption apparatus 100 using the carbon dioxide adsorption element 110 of the sixth to ninth modification examples, a plurality of adsorber containers 101 can be used. In this case, carbon dioxide can be adsorbed by carbon dioxide adsorption elements 110 in some adsorber containers 101, whereas the carbon dioxide adsorption elements 110 in the remaining adsorber containers 101 can be regenerated. Furthermore, when the amount of carbon dioxide that has to be removed is small, the carbon dioxide adsorption elements 110 in some adsorber containers 101 can be in a standby mode. Furthermore, it is preferred that the pressure of air introduced into the adsorber container 101 is set lower when carbon dioxide is adsorbed than when the amine groups 113 are regenerated so as to be close to the pressure outside the aircraft. As a result, the release of carbon dioxide from the amine groups 113 can be enhanced.

The present invention is not limited to the above-described embodiment and modification examples. For example, the carbon dioxide adsorption elements can be formed to have a shape of cone, semispherical or cup, and stacked via gaps. Furthermore, an aircraft air conditioner can be used for conditioning the external air compressed by an electric motor rather than the air extracted from the engine. Moreover, the carbon dioxide adsorption element can be used for adsorbing carbon dioxide contained in the air in the space other than that in the aircraft.

The invention claimed is:

1. A carbon dioxide adsorption element for adsorbing carbon dioxide contained in air, comprising:
   a foil-like or plate-like support member,
   a porous aluminum oxide film covering said support member,
   amine groups clinging to the inner surface of each pore of said film for carbon dioxide adsorption,
   said film being formed by oxidation of aluminum or aluminum alloy,
   wherein
   the depth direction of each pore of said film is the thickness direction of said support member.

2. The carbon dioxide adsorption element according to claim 1, wherein the pores include a large-diameter pore disposed at the surface and a plurality of small-diameter pores opened in the bottom section of said large-diameter pore as each pore formed in said film.

3. The carbon dioxide adsorption element according to claim 1 or 2, wherein the inner diameter of the pore surrounded by said amine groups clinging to the inner surface of each pore of said film is 2 nm to 100 nm.

4. The carbon dioxide adsorption element according to claim 2, wherein the inner diameter of the pore surrounded by said amine groups clinging to the inner surface of said small-diameter pore is 2 nm to 100 nm, and the inner diameter of the pore surrounded by said amine groups clinging to the inner surface of said large-diameter pore is more than 100 nm.

5. The carbon dioxide adsorption element according to claim 1, wherein said support member is made from aluminum or aluminum alloy, and said film is formed by oxidation of the surface layer of said support member.

6. The carbon dioxide adsorption element according to claim 1, wherein said support member includes an electric resistance element having electrical conductivity and connected to a power supply unit for resistance heating, and
   carbon dioxide adsorbed by said amine groups is released by resistance heating of said electric resistance element.

7. A carbon dioxide adsorption apparatus comprising:
   the carbon dioxide adsorption element according to claim 1,
   a coil for generating alternating magnetic flux, and
   said support member including an electrically conductive element that has electrical conductivity and is disposed in the position through which the magnetic flux generated by the coil passes, wherein
   carbon dioxide adsorbed by said amine groups is released by induction heating of said electrically conductive element.

8. A method for manufacturing a carbon dioxide adsorption element, comprising the steps of:
   forming a foil-like support member made from aluminum or aluminum alloy,
   forming a porous film by conducting anodization of the surface layer of said support member, and
   causing amine groups for carbon dioxide adsorption to cling to the inner surface of each pore of said film.

9. A method for manufacturing a carbon dioxide adsorption element, comprising the steps of:
   forming a plate-like support member in which at least the surface layer is made from aluminum or aluminum alloy,
   forming a porous film by conducting anodization of the surface layer of said support member, and
   causing amine groups for carbon dioxide adsorption to cling to the inner surface of each pore of said film.

10. A carbon dioxide adsorption element for adsorbing carbon dioxide contained in air, comprising:
    a support member,
    a porous film covering said support member,
    amine groups clinging to the inner surface of each pore of said film for carbon dioxide adsorption, and
    said support member including an element that is heated by electric energy, wherein
    carbon dioxide adsorbed by said amine groups is released by heating said element.

11. The carbon dioxide adsorption element according to claim 10, wherein said support member has a foil-like or plate-like form, and the depth direction of each pore of said film is the thickness direction of said support member.

12. The carbon dioxide adsorption element according to claim 10, wherein said heated element is an electric resistance element having electrical conductivity and connected to a power supply unit for resistance heating, and
    carbon dioxide adsorbed by said amine groups is released by resistance heating of said electric resistance element.

13. A carbon dioxide adsorption apparatus comprising:
    the carbon dioxide adsorption element according to claim 10,
    a coil for generating an alternating magnetic flux, wherein
    said heated element is an electrically conductive element that has electrical conductivity and is disposed in the position through which the magnetic flux generated by the coil passes, and
    carbon dioxide adsorbed by said amine groups is released by induction heating of said electrically conductive element.

* * * * *